US006848613B2

(12) United States Patent
Nielsen et al.

(10) Patent No.: US 6,848,613 B2
(45) Date of Patent: Feb. 1, 2005

(54) SYSTEM AND METHOD FOR THE SECURITY OF PAYMENT TRANSACTIONS

(75) Inventors: Bruce Jeremy Nielsen, Devon (GB); Hugh Michael O'Donnell, Montpellier (FR)

(73) Assignee: Newt Limited (GB)

( * ) Notice: Subject to any disclaimer, the term of this patent is extended or adjusted under 35 U.S.C. 154(b) by 0 days.

(21) Appl. No.: 10/339,420

(22) Filed: Jan. 9, 2003

(65) Prior Publication Data

US 2003/0168509 A1 Sep. 11, 2003

Related U.S. Application Data

(63) Continuation of application No. PCT/GB01/03115, filed on Jul. 11, 2001.

(30) Foreign Application Priority Data

Jul. 11, 2000 (GB) .............................................. 0017044

(51) Int. Cl.[7] .............................................. G06F 17/60
(52) U.S. Cl. .......................... 235/379; 235/380; 705/16
(58) Field of Search ................................ 235/379, 380, 235/382; 705/15–17

(56) References Cited

U.S. PATENT DOCUMENTS

| | | | |
|---|---|---|---|
| 4,396,985 A | | 8/1983 | Ohara |
| 5,457,305 A | | 10/1995 | Akel et al. |
| 5,500,890 A | | 3/1996 | Rogge et al. |
| 5,748,908 A | | 5/1998 | Yu |
| 5,850,077 A | * | 12/1998 | Tognazzini .................. 235/380 |
| 5,850,217 A | | 12/1998 | Cole |
| 5,933,812 A | * | 8/1999 | Meyer et al. .................. 705/15 |
| 6,019,393 A | | 2/2000 | Loebner |
| 6,076,079 A | * | 6/2000 | Boston et al. .............. 705/400 |

FOREIGN PATENT DOCUMENTS

| | | |
|---|---|---|
| DE | 3 423 068 A1 | 1/1985 |
| EP | 0 406 663 A2 | 1/1991 |
| EP | 1 001 388 A2 | 5/2000 |
| EP | 1 162 576 A2 | 12/2001 |
| GB | 2 281 648 A1 | 3/1995 |
| JP | 2000-090154 | 3/2000 |
| WO | WO 95/12269 | 5/1995 |
| WO | WO 96/26505 A1 | 8/1996 |

* cited by examiner

*Primary Examiner*—Michael G. Lee
*Assistant Examiner*—Jamara A. Franklin
(74) *Attorney, Agent, or Firm*—Lerner, David, Littenberg, Krumholz & Mentlik, LLP

(57) ABSTRACT

A method of authorizing a payment transaction is described. The method comprises receiving data relating to a customer's transaction card, and data relating to an original amount of the payment transaction; presenting the original amount data to the customer such that a gratuity amount can be determined and in response thereto receiving data relating to the gratuity amount; establishing a link with an acquirer via a telecommunications network and seeking online authorization for the payment transaction by transmitting the transaction card data and data relating to a value of the transaction and generating and providing receipt data to the customer. The transaction value comprises the gratuity amount and the original amount and the receipt data confirms authorization of the payment transaction at the transaction value when the transaction has been authorized. A method of authorizing concurrent payment transactions, such as may be generated by multiple mobile handsets and a base terminal, is also described.

30 Claims, 16 Drawing Sheets

SYSTEM AND METHOD FOR THE SECURITY OF PAYMENT TRANSACTIONS

CROSS-REFERENCE TO RELATED APPLICATIONS

This application is a continuation of International Application No. PCT/GB01/03115, filed Jul. 11, 2001, and published in English under International Publication No. WO 02/05223 on Jan. 17, 2002 and claims the priority of British Patent Application GB 0017044.9 filed Jul. 11, 2000. The entire disclosure of International Application No. PCT/GB01/03115 and British Patent Application GB 0017044.9 are incorporated herein by reference.

BACKGROUND OF THE INVENTION

The present invention concerns improvements relating to the security of payment transactions and provides, more specifically, though not exclusively, a method and apparatus for authorising electronic payment transactions such as those suitable for implementation by the APACS standards in the UK, where the amount to be paid may incorporate a gratuity.

Payment by credit or debit card, also known as electronic fund transfer (EFT), is rapidly becoming the preferred method of payment in many countries around the world. The number of payment cards issued is predicted to soar over the coming years, along with the number of purchases made using such cards. There are, however, serious concerns regarding the security of EFT systems and their robustness to fraud.

Debt arising from payment card fraud is generally met by the payment card issuing companies, but cardholders unwittingly pay for any unauthorised transactions that they fail to identify. Most cardholders, on receiving their monthly payment card statements, briefly check that their consumer activities are properly reflected. Few, however, go so far as retaining all of their receipts and marrying them up with the statement entries and so fraudulent transactions associated with genuine purchases often evade detection. More particularly, and to the surprise of many cardholders, EFT transactions which support gratuity payments are inherently susceptible to discrete manipulation because of the underlying processing systems which are employed.

Merchants who wish to accept EFT payments must install a terminal for authorising electronic fund transfers at the point of sale (EFTPOS). An EFTPOS terminal typically comprises a payment card reader device, an operator input device such as a keypad, an output display screen, an EFT processing engine, a database for recording transaction details, a modem and a printer for printing off transaction slips and receipts. Each EFTPOS terminal connects to the host terminals of so-called acquirers, which are responsible for the electronic data capture of one or more credit/debit card issuing companies. The connection is made via an EFT network, such as a hard-wired telephone network.

After payment card details and the amount to be paid have been entered, the merchant terminal contacts the relevant acquirer host terminal for authorisation of the payment. The information relating to the payment, including an authorisation code received from the acquirer host terminal, is stored locally at the merchant terminal until the transaction data is polled from the merchant terminal at a later stage. By polling it is meant a process whereby an acquirer host terminal addresses a merchant terminal, establishing a communications link across an EFT network, such that the merchant terminal is able to send data back to the acquirer host terminal on demand. The advantage of polling is that it can be carried out at a time suitable for the acquirer host terminal, usually at a time of low transaction activity.

Organisations which oversee the use of EFT networks for payment transactions impose certain governing standards and the EFTPOS terminals must be configured accordingly. For example, use of EFT networks in the UK is overseen by the Association for Payment Clearing Services (APACS). The associated standards are referred to as APACS n v.m, where n is the number by which the standard is referenced and m is its version number. The current standards in the UK which facilitate gratuity payments by credit or debit cards are APACS 30 v.15, which is concerned with obtaining authorisation for electronic payment transactions, in conjunction with APACS 50 v.15, which is concerned with the polling of authorised electronic payment transaction data. These standards and the problems associated with them are explained in more detail below, but it is to be appreciated that gratuity payments are supported by equivalent standards in other countries around the world.

Consider a customer who, on being presented with a bill in a restaurant, elects to pay by EFT and provides a payment card. The payment card is taken away to the merchant's EFTPOS terminal where the payment card details and a sale amount are entered and stored. In accordance with the APACS 30 standard, this information, together with a merchant ID, is sent as an authorisation request to the appropriate acquirer host terminal via the EFT network. On receiving the request the acquirer host terminal accesses the cardholder's account and, if the card is valid and sufficient funds are available, generates a code authorising payment to the merchant. The authorisation code is transmitted back to the merchant terminal and prompts the printing of an authorised transaction slip. This slip, together with a carbon copy backing, is removed and presented to the cardholder for signature.

An example of an authorised payment transaction slip 10 is shown in FIG. 1. The name and address of the merchant 12 are displayed at the head of the slip. The payment card details 14, including its type, number, expiry date and issue number, are then stated below, followed by a sale amount 16. Fields for a gratuity 18 and a final total amount 20 are to be completed by the cardholder, as is a signature field 22 where the cardholder confirms that their payment account should be debited as indicated on the slip. The signature field is followed by the acquirer's authorisation code 23. Finally, additional information about the transaction 24, such as the date and time 25, the merchant terminal number 26, the merchant ID 27, the receipt number 28 and the reference number 29 is printed at the bottom of the slip.

After the cardholder has completed the authorised transaction slip 10, the cardholder's signature is compared to that written on the payment card as a local security check. The cardholder is then handed the transaction slip 10, whilst the carbon copy is retained by the merchant.

As an alternative to carbon copy backing slips, a first version of an authorised transaction slip as shown in FIG. 1 may be printed, completed by the cardholder and retained by the merchant, but a second version may subsequently be printed showing the total amount to be paid in the transaction. The second version does not require the cardholder's signature, as it is merely a confirmatory statement of what the cardholder has agreed to, and is therefore deemed more secure.

Although the merchant has been provided with an authorisation code for the sub-total 16, the final total 20 will exceed this if the cardholder has elected to include a gratuity 18. Rather than requiring the merchant to contact the acquirer for further authorisation, the APACS 30 standard permits authorisation codes 23 to extend to final total amounts 20 which lie within a percentage of the authorised sale amount 16, which is typically 15%. Thus, by referring to the carbon copy of the authorised transaction slip 10, the merchant is able to recall the transaction details using the reference number 29 from the database stored on the EFTPOS terminal and replace the authorised sale amount 16 with the new total amount 20. This "tolerance" of authorisation codes 23 prevents the cardholder from being unduly delayed at the transaction site, minimises the amount of processing to be performed by the merchant terminal and also helps to restrict "traffic" on the EFT networks. However, the APACS 30 standard dictates that merchants must seek additional authorisation, or "re-auth", for final totals 20 which fall beyond the permitted tolerance.

Finally, in accordance with the APACS 50 standard, the merchant's EFTPOS terminal is polled by the acquirer host terminals at a predetermined time (usually late at night), instigating an upload of details for all of the transactions which have been authorised and completed through it for subsequent settlement.

Unfortunately present systems which facilitate electronic gratuity payments, as described above, are open to fraudulent abuse. As a matter of custom cardholders generally make gratuity payments which are 10% of the sub-total amount 16. Unscrupulous merchant staff can tamper with gratuity amounts 18 and final totals 20 shown on carbon copy transaction slips before passing them on to an EFTPOS terminal operator, thereby increasing the pay that will be awarded to them in respect of the transactions by the merchant. Current systems often fail to alert the merchant, acquirer or card issuer to this type of fraud and it is becoming an increasingly common practice which merchants are keen to stamp out as it is highly damaging to their reputations. If stringent accountancy checks are not enforced, it is also possible for terminal operators, prior to polling by the acquirer host terminals, to elevate final totals 20 to the maximum amount that they think will evade detection. Indeed, this latter practice is conducted as a matter of routine in some establishments prior to its discovery.

Detection of this particular fraud is highly reliant on cardholders vigilantly policing their payment card statements. However, because the fraudulent increases are relatively small (say 5%) they are often difficult to detect and, in any event, many transaction slips are absent-mindedly discarded so that comparison with the intended amount cannot be made. Even if the fraud is noticed, a cardholder may fail to report it as they perceive the recovery of funds to be a time-consuming process and not worth pursuing if the amount involved is relatively small.

There are also inherent disadvantages associated with the polling of information from merchant terminals. For example, the failure rate of polling processes is estimated to be around 8%. Such failures cause delays in settlement of the transaction funds which can seriously affect merchant cash flow and, in addition, any interest which would have accumulated in the merchant's account is lost. There are also significant charges associated with polling itself— merchants are typically charged between £10 and £15 per month for each of their EFTPOS terminals. A merchant's income is further reduced if a final total exceeds an authorised tolerance and authorisation is refused when the "re-auth" procedure is executed; payment from the acquirer for the gratuity amount is then irretrievably lost.

It is desired to overcome or substantially reduce some of the abovementioned problems. More specifically, it is desired to provide a method and an apparatus for authorising and effecting electronic payment transactions which offer improved resistance to fraud committed at merchant sites, particularly where gratuity payments are concerned.

The inventors of the present invention are the first to appreciate that the established practice of seeking a gratuity from a customer after a transaction amount has been authorised is not necessary and is the root cause of the disadvantages described above. Accordingly, the present invention resides in the appreciation that an improved authorisation process for electronic payment transactions, which incorporate gratuity payments, can be achieved simply by determining the total amount that is to be paid electronically prior to obtaining authorisation for a transaction from an acquirer.

Whilst at first sight this concept may appear to be a relatively trivial and obvious variation from the existing procedure, it is to be appreciated that it provides significant advantages over known methods which are described in detail later. In addition, this variation is a complete departure from the existing direction of developments in this field of technology, which are to improving the various polling techniques utilised with existing payment transactions. Rather, the present invention is such a fundamental divergence from the direction of development in this field that it does not suffer any of the problems associated with polling at all.

More specifically, according to one aspect of the present invention there is provided a method of authorising a payment transaction, the method comprising: receiving data relating to a customer's transaction card, and data relating to an original amount of the payment transaction; presenting the original amount data to the customer such that a gratuity amount may be added and in response thereto receiving data relating to the gratuity amount; establishing a link with an acquirer via a telecommunications network and seeking online authorisation for the payment transaction by transmitting the transaction card data and data relating to a value of the transaction, the transaction value comprising the gratuity amount and the original amount; and generating and providing receipt data to the customer, the receipt data confirming authorisation of the payment transaction at the transaction value when the transaction has been authorised.

Here the term "acquirer" is intended to include any entity acting as a financial transaction handling proxy which has the right to authorise transactions on an acquirer's behalf.

By establishing the value of the payment transaction in this way, authorisation can be obtained for the total amount that is to be paid, comprising the original amount and the gratuity amount, rather than just for the original amount as is the practice in the prior art. The present invention makes the practice of issuing authorisations with which inherent tolerances are associated, permitting post-authorisation manipulation of transaction values, redundant. Hence, a whole level of post-authorisation processing conducted at the merchant site is removed, such that merchant staff are no longer presented with a legitimate opportunity to manipulate the values of payment transactions subsequent to their receiving authorisation. Given that those opportunities have previously been exploited for fraudulent purposes, it is apparent that the present invention offers improved security over those methods of transaction authorisation which are known from the prior art.

In addition to security considerations, the present invention can also be implemented by acquirers at a significantly reduced cost compared to that spent on implementing prior art systems. Since transactions do not need to be recalled for completion the transaction details are transmitted to the acquirer at the time of seeking authorisation for the total transaction amount, the polling processes of the prior art are also made obsolete by the present invention. The costs associated with developing, implementing and maintaining a polling system are considerable; for example, a large back office support staff is typically required.

Preferably, the customer transaction card data is stored on a personal item of the customer and the method further comprises obtaining the transaction card data from the personal item for the purposes of authorising the payment transaction. For example, the transaction card data may be stored on a magnetic strip of a customer's transaction card, such that it can be read quickly when the card is swiped through a magnetic card reader. Alternatively, an electronic chip located on a customer's transaction card may be used to store the transaction card data, thereby making the transaction card difficult to replicate. Of course, the data may merely be clearly visible from the personal item with the naked eye, for example if it were to be displayed on a personal hand held organiser, in which case the transaction data could simply be read and then manually inputted for conversion into an electronic format.

It is also advantageous if the data concerning the transaction card that is received includes the expiry date of the card. This information can then be sent to the acquirer as part of the authorisation request, guarding against fake cards which have been manufactured using valid account details but unknown expiry dates. On receiving an authorisation request, an acquirer host terminal can perform an independent check that the expiry date received agrees with that stored in its database record for the payment transaction card. If the dates do not agree, authorisation of the transaction will not be given.

Authorisation may be obtained more quickly in some instances if the establishing step is triggered by the occurrence of the receiving step, such that it is carried out at least in part concurrently with the presenting and gratuity amount receiving steps. That is to say that the present invention is not restricted to submitting an authorisation request only further to the value of the transaction being determined.

Merchants will also find it beneficial, for accounting purposes, if receipt data which is issued in respect of an authorised transaction is stored in a local database. In addition, in the event of any future query being made by a customer regarding their transaction, the transaction details can be readily recalled.

It is also advantageous for the method to further comprise creating one or more software session instances for the payment transaction requiring on-line authorisation, the software session instances controlling the receiving, presenting, establishing, transmitting, and generating and providing steps for the transaction. By "on-line" it is meant requesting authorisation of a payment transaction in real-time whilst the customer is waiting. A plurality of software session instances allows transaction card details to be received concurrently from more than one source so that initial processing can be performed in parallel. In what follows, the terms "concurrent" or "concurrently" as applied to payment transactions mean payment transactions where at least part of the processing of each respective payment transaction is conducted in parallel, namely processing of one payment transaction is being carried out at a given moment during the processing of another payment transaction. Also where more than one software session instance is created per payment transaction, it is possible to break down the above-mentioned method into modular processes which can be accessed by different payment transactions. This is particularly useful where there are shared resources, such as a communications link.

If there are a plurality of payment transactions to be processed and software instances are created for each payment transaction, then the method may further comprise implementing the receiving, presenting, establishing, transmitting, and generating and providing steps for the plurality of payment transactions concurrently. In this way, details of multiple transactions can be received from a single source without authorisation having yet been received for the previous transaction. So, a terminal operator may swipe several transaction cards through a magnetic card reader, one after the other, to trigger the processing of an individual authorisation request for each payment that is to be made. By allowing for concurrent processing, the time taken to obtain transaction authorisation, and the delay to the customer, can be kept to a minimum.

The present invention also extends to a payment transaction apparatus for carrying out an authorised payment transaction, the apparatus comprising: input means for inputting data relating to a customer's transaction card, and data relating to an original amount of the payment transaction; presenting means arranged to present the original amount data to the customer such that a gratuity amount can be determined and in response thereto data relating to the gratuity amount can be input via the input means; communication means arranged to establish a link with an acquirer via a telecommunications network and to seek online authorisation for the payment transaction by transmitting the transaction card data and data relating to a value of the transaction, the transaction value comprising the gratuity amount and the original amount; and means for generating and providing receipt data to the customer, the receipt data confirming authorisation of the payment transaction at the transaction value when the transaction has been authorised.

The present invention also provides a system for implementing and authorising a payment transaction, the system comprising: a payment transaction apparatus as described for the second aspect of the present invention; an acquirer apparatus arranged to receive a request for an online authorisation of a payment transaction from the payment transaction apparatus, to authorise the payment transaction at the transaction value and to transmit an authorisation confirmation over the telecommunications network to the payment transaction apparatus.

According to another aspect of the present invention there is provided a method of authorising concurrent payment transactions with an acquirer, the method comprising: establishing a link with the acquirer via a telecommunications network and transmitting a request for an online authorisation of a first payment transaction using received payment transaction data; storing data relating to a second concurrent payment transaction in a queue, whilst awaiting the result of the online authorisation of the first payment transaction; using the established link to the acquirer to transmit a request for online authorisation for the second payment transaction using the payment transaction data stored in the queue, once the result of the online authorisation request for the first payment transaction has been received.

In this way, when a communications link is established with an acquirer, it may be used to obtain authorisation for further transactions requiring authorisation from that same acquirer rather than being dropped after authorisation has been obtained only for a first transaction. Generally, the most time-consuming part in obtaining authorisation for a transaction, particularly where a public switched telephone network is employed, is the establishing of a communications link with the relevant acquirer. Hence, the speed with which transaction authorisation is obtained can be improved using the present invention whenever there may be concurrent transactions for the same acquirer.

While the telecommunications link is still established and in use, the storing step described above may comprise storing further transaction data in the queue relating to other concurrent payment transactions, such that many transactions may be awaiting authorisation simultaneously. In this way, data relating to a plurality of payment transactions can be received, initially processed and stored, prior to a communications link with each transaction's acquirer being sought. The greater the number of transactions for a given acquirer that are stored, the greater the improvement in efficiency that is obtained.

The method may further comprise: removing data relating to a concurrent payment transaction from the queue once an authorisation result for that transaction has been received; checking the contents of the queue; and relinquishing the established link with the acquirer once there is no further transaction data stored in the queue, after the result of the online authorisation request for the last transaction has been received. Hence, termination of a communications link with an acquirer can be avoided when further transaction data has been received requiring authorisation from the same acquirer. In other words, before dropping a communications link, a check is always made to see if the link could be of immediate further service and should therefore be maintained. Use of a queue in this way provides an efficient way of handling asynchronous authorisation requests which it is desired to process sequentially.

In order to better process transaction data when authorisation for concurrent transactions may be sought from more than one acquirer, the method may further comprise: considering the acquirers to which the other concurrent payment transactions relate, and the storing step may comprise storing only that transaction data in the queue which is directed to the same acquirer as the first payment transaction. In addition, transaction data which relates to a different acquirer may be stored in a respective queue related to that acquirer for subsequent transmission thereto. Hence, by forming separate queues of transactions awaiting authorisation for each different acquirer (in other words streaming transactions according to their destination acquirer), it is possible to group together those payment transactions which can take advantage of the present invention, thereby optimising the operation of authorising payment transactions to different acquirers.

It is also advantageous for the method to further comprise creating one or more software session instances for each payment transaction requiring on-line authorisation, the software session instances controlling the establishing, transmitting, storing and using steps for that transaction. This is because transaction card details can then be received concurrently from more than one source and initial processing can be performed in parallel.

Given the capability to process many transaction authorisation requests concurrently, the method may further comprise receiving concurrent payment transaction data from a plurality of remote terminals. Hence, all transaction authorisation requests can be transmitted to a central EFTPOS terminal where they are queued according to their destination acquirer, thereby saving costs over having multiple stand-alone EFTPOS terminals. If the remote terminals are portable then there is also the added advantage that they can be used in close proximity to the customer thereby improving security, since the customer's payment transaction card, say, need never leave their sight.

This aspect of the present invention may also be considered to extend to a method of authorising concurrent payment transactions with a first and a second acquirer, the method comprising a method of authorising concurrent payment transactions from a first acquirer as stated above, wherein the storing step comprises: storing data relating to further concurrent payment transactions in the queue and a further queue in dependence upon the acquirer to which the payment transaction relates, whilst awaiting the result of the online authorisation for the first payment transaction; the method further comprising: relinquishing the established link with the first acquirer once there are no further transaction data requests stored in the queue, after the result of the online authorisation request for the last transaction to the first acquirer has been received; and establishing a link with the second acquirer via the telecommunications network and transmitting a request for an online authorisation of a further payment transaction using received payment transaction data stored in the further queue.

This aspect of the present invention can also be considered as a method of authorising concurrent payment transactions with an acquirer, the method comprising: receiving data relating to a first and second payment transactions from one or more remote terminals; storing the data relating to the second payment transaction in a queue; establishing a link with the acquirer via a telecommunications network and transmitting a request for online authorisation for the first payment transaction using the received first payment transaction data; using the established link to the acquirer to transmit a request for online authorisation for the second payment transaction, using the received second payment transaction data, once the result of the online authorisation request for the first transaction has been received; and relinquishing the established link with the acquirer after the result of the online authorisation request for the second transaction has been received.

Alternatively, this aspect of the present invention can be understood to be a method of authorising concurrent payment transactions with an acquirer, the method comprising: establishing a link with the acquirer via a telecommunications network; storing data relating to at least one concurrent payment transaction, required for seeking an online authorisation, in a queue; using the established link to the acquirer to sequentially transmit requests for and receive results of online authorisations relating to each of the concurrent payment transactions until the queue is empty.

The present aspect of the invention also extends to an apparatus for authorising concurrent payment transactions with an acquirer, the apparatus comprising: communication means arranged to establishing a link with the acquirer via a telecommunications network; transmitting means arranged to transmit a request for an online authorisation of a first payment transaction over the link using received payment transaction data; and a store for storing data relating to a second and other concurrent payment transactions in a queue, whilst awaiting the result of the online authorisation of the first payment transaction; the transmission means being arranged to use the established link to the acquirer to transmit a request for online authorisation for the second payment transaction using the payment transaction data stored in the queue of the store, once the result of the online authorisation request for the first payment transaction has been received.

Advantageously the transmission means may comprise a finite state machine, such that account may be taken of different conditions which determine what action is to be implemented. Use of a finite state machine in such a transaction processing apparatus provides an efficient way of handling a plurality of interactive processes which change in dependence on external conditions.

The present aspect of the invention also extends to a system for implementing and authorising a payment transaction, the system comprising: a payment transaction apparatus according to the apparatus described above; an acquirer apparatus arranged to receive a request for an online authorisation of a payment transaction from the payment transaction apparatus, to authorise the payment transaction at the transaction value and to transmit an authorisation confirmation over the telecommunications network to the payment transaction apparatus.

BRIEF DESCRIPTION OF THE DRAWINGS

Methods and apparatus according to presently preferred embodiments of the invention for authorising and effecting electronic payment transactions will now be described by way of example, with reference to the accompanying drawings in which.

DETAILED DESCRIPTION OF PREFERRED EMBODIMENTS

Figure 2:
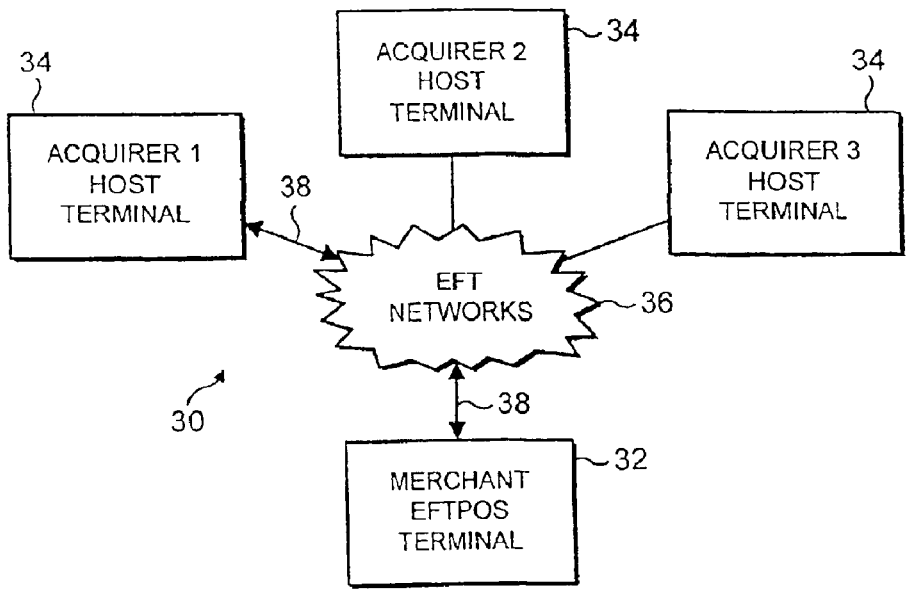
FIG. 2 is a schematic block diagram showing a system for authorising electronic payment transactions, including a communications system across which authorisation for electronic fund transfers is obtained, according to presently described embodiments of the invention.

With reference to FIG. 2, an authorisation system 30 for implementing a first and a second embodiment of the present invention will now be described. The authorisation system 30 facilitates communication between the parties involved in an electronic payment transaction, namely a merchant, a payment cardholder and an acquirer who will capture the electronic data concerning the transaction on behalf of the payment card issuer. It enables the merchant to check whether the acquirer will settle the cardholder's bill in due course, particularly when the cardholder also wishes to make a gratuity payment using their payment card. The authorisation system 30 shown in FIG. 2 is comprised of a merchant EFTPOS terminal 32 and a plurality of acquirer host terminals 34 (of which only three are shown) which are connected by a central communications hub, namely an EFT network 36 such as a public telephone network. In what follows, the different and specific ways in which the authorisation system 30 is used to implement the first and the second presently preferred embodiments of the invention are described.

Figure 3:
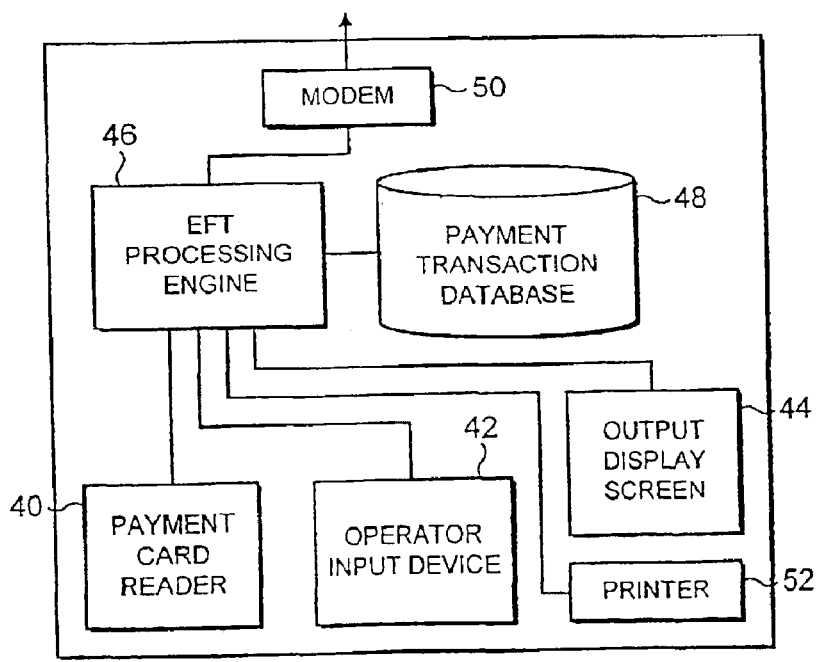
FIG. 3 is a schematic block diagram showing a merchant EFTPOS terminal as featured in the authorisation system of FIG. 2, according to a first embodiment of the invention.

An EFTPOS terminal 32a of the first embodiment is shown in more detail in FIG. 3 and comprises the same elements as those described for the prior art, namely a payment card reader 40, an operator input device 42, an output display screen 44, an EFT processing engine 46, a payment transaction database 48, a modem 50 and a printer 52. However, the EFTPOS terminal 32a is configured to operate in a different manner from that taught by the prior art as is described below.

The payment card reader 40 is arranged to quickly extract payment card details. Two types of payment card are currently available, the first being a magnetic strip variety where information has been magnetically encoded onto the card and the second being so-called "smart cards" which contain integrated circuitry giving the card limited processing capabilities. Magnetic cards are usually "swiped" through a payment card reader 40, whilst smart cards are inserted into a reader 40 which accesses the information held on their data store. The payment card reader 40 is arranged to read both types of card. The operator input device 42 is a keypad which is used to input a sale amount and which may also be of assistance if the card reader 40 has difficulty in extracting the payment card details (for example if the card has been damaged in some way). The EFT processing engine 46 communicates with a terminal operator via the output display screen 44, but this screen could also serve as an operator input device 42 if it was arranged to be touch sensitive. Hence, the payment card reader 40, the operator input device 42 and the display screen 44 behave in essentially the same manner as in the prior art systems.

However, the remaining elements are arranged to perform slightly different functions to those required by existing processing systems, in that they enable authorisation to be obtained in real-time for a total amount that the cardholder wishes to pay. This is achieved by providing the cardholder with the opportunity to finalise their bill before contacting the relevant acquirer host terminal 34 for authorisation.

An authorisation process 60 for determining the full amount to be paid and obtaining authorisation for that amount will now be described with reference to FIG. 4. The authorisation process 60 breaks down into three key stages: (1) inputting of payment card details and sale information; (2) printing off of a signature slip which is then completed by the cardholder; and (3) obtaining transaction authorisation from an acquirer host terminal.

The first stage is initiated at step 62 by inputting the payment card details into the EFTPOS terminal 32a using the payment card reader 40. These details are sent to the EFT processing engine 46 at step 64, which then stores them in the payment transaction database 48. The EFT processing engine 46 issues a message to the output display screen 44 at step 66, prompting the terminal operator to enter a sale amount using the operator input device 42 which is subsequently written to the payment transaction database 48. The sale amount, together with the payment card details input at step 62, are sent by the EFT processing engine 46 to the printer 52. This instigates the second stage of the authorisation process 60, whereby a transaction signature slip, which is to be retained by the merchant, is printed off from the EFTPOS terminal and presented to the cardholder.

The information to be displayed on each signature slip is printed off in two parts. The first part comprises the payment card details and the sale amount and is printed at step 68 in the authorisation process 60, producing a "small ticket". The information printed for the second part depends upon the mode of terminal operation pre-selected by the terminal operator, as considered at step 70.

Figure 5:
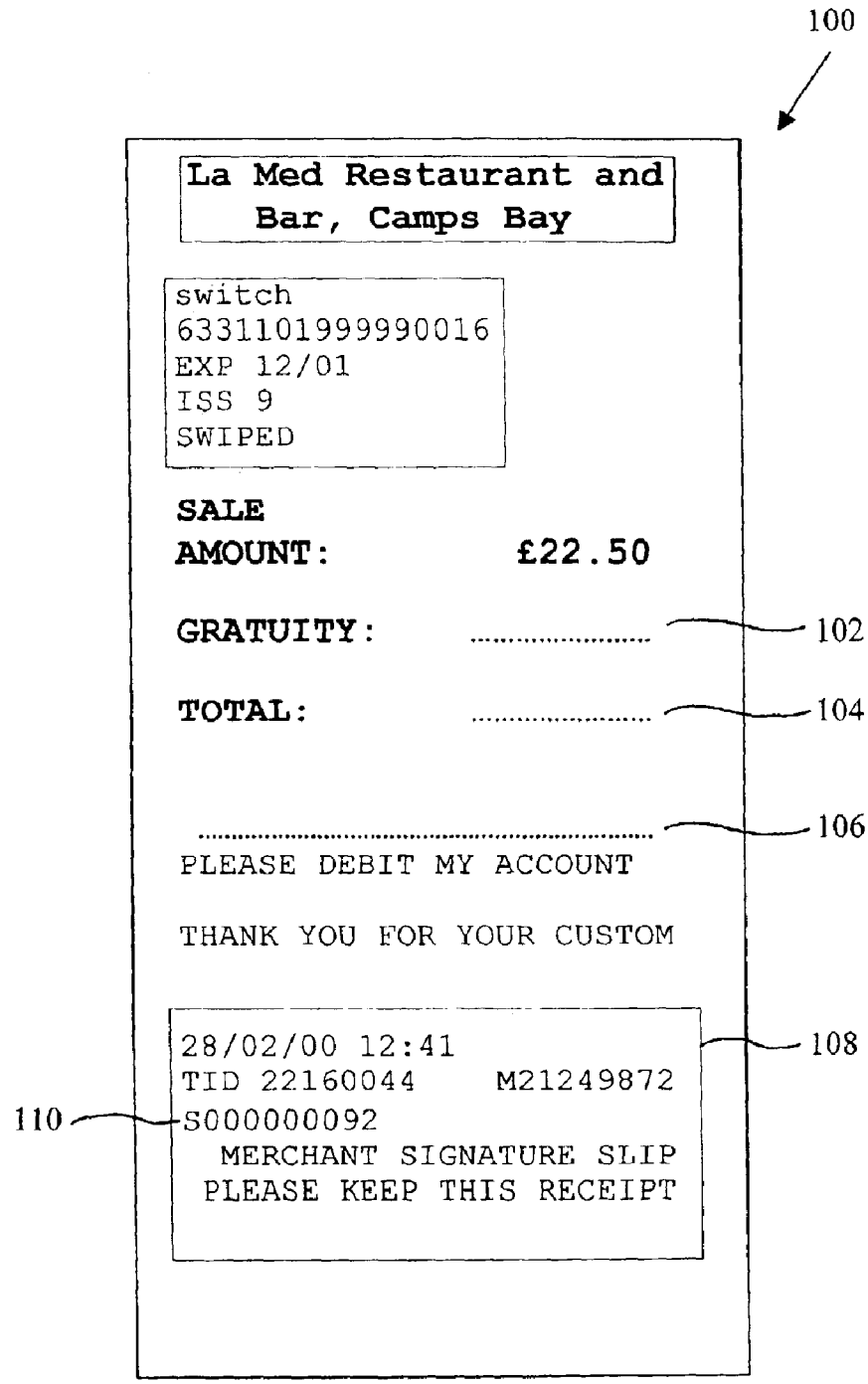
FIGS. 5 and 6 are plan views of transaction signature slips which have been produced in accordance with presently described embodiments of the invention.
Figure 6:
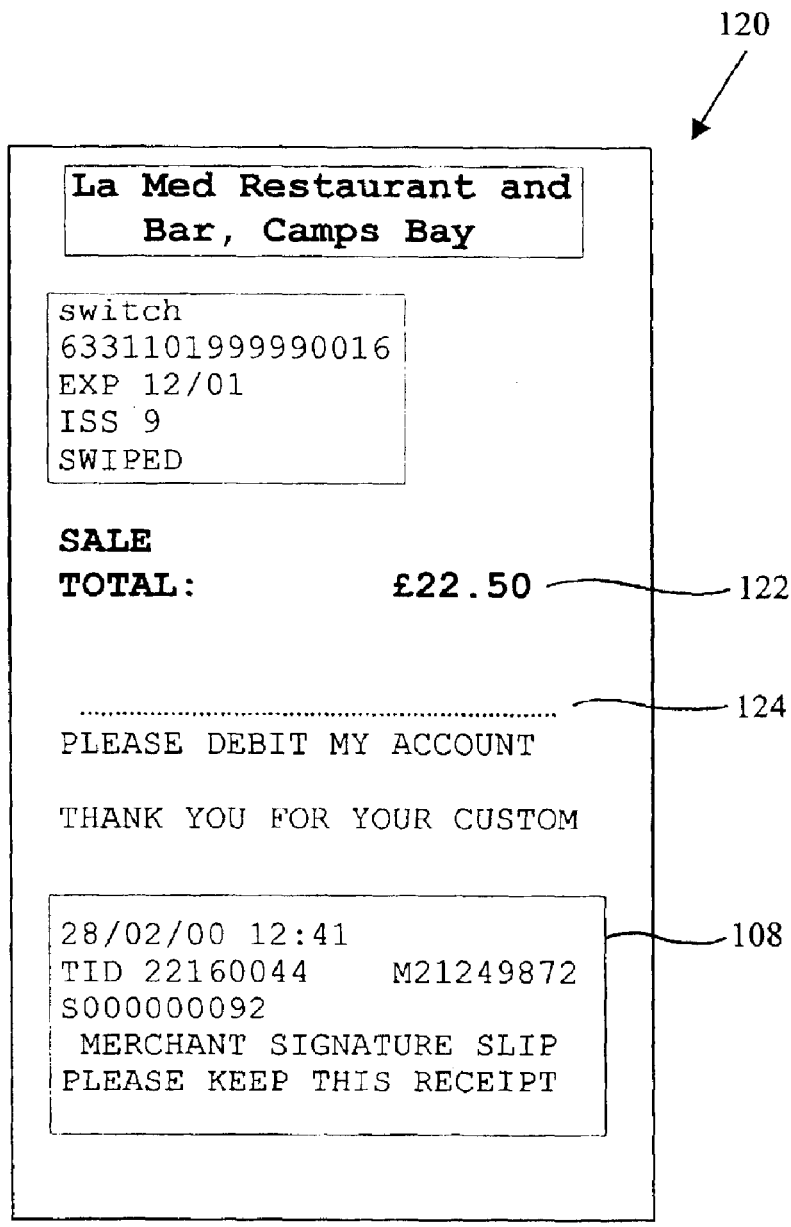

The two modes of operation are "gratuity" and "nongratuity". Examples of the different types of signature slip 100 and 120 which are produced by these modes are shown in FIGS. 5 and 6, respectively. If the EFTPOS terminal 32a is operating in gratuity mode, then the EFT processing engine 46 instructs the printer 52 at step 72 to print off lines which permit a gratuity amount 102 and a total amount 104 to be entered, as shown in FIG. 5. A signature field line 106 is also printed, followed by additional information concerning the transaction 108. Under the non-gratuity mode of operation, the EFT processing engine 46 instructs the printer 52 at step 74 to restate the sale amount as the total amount 122, to print off a signature field line 124 and to print out the same additional information 108 regarding the transaction as included at the end of the gratuity-mode signature slip 100, as shown in FIG. 6. This second mode of operation is required for situations where it is not appropriate to suggest gratuity payments. For example, if a cardholder correctly complains that they have been overcharged on their itemised bill, the merchant may dictate that the cardholder should not in any way be induced to make a gratuity payment. Alternatively, the merchant may offer other services which do not attract gratuity payments—for example a restaurant which also operates a take-away facility—in which case merchant staff can present cardholders with transaction signature slips which are appropriate for the service they have used.

Figure 1:
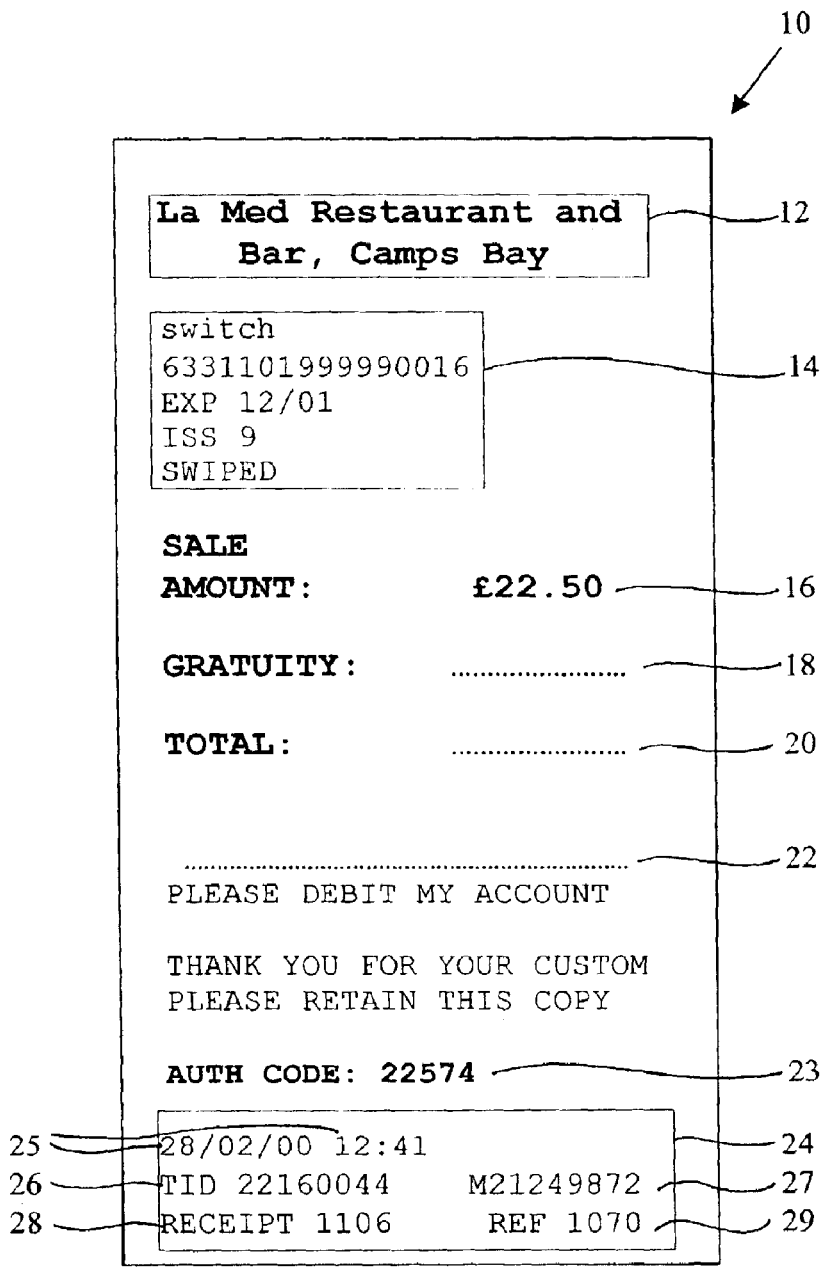
FIG. 1 is a plan view of an authorised payment transaction slip which has been produced in accordance with the prior art.

The signature slips of FIGS. 5 and 6 are very similar to the authorised transaction slip 10 of the prior art, shown in FIG. 1. The key difference, however, is that the sub-total amounts on the signature slips 100 and 120 have not been authorised by an acquirer host terminal 34. The authorisation code 23, present in FIG. 1, is therefore absent from these slips. Another difference can be seen between the additional information 108 and 24 that is provided about the transaction—an internal reference number for recalling the transaction for completion is not quoted in the additional data 108, as contact has not yet been made with the acquirer host terminal 34; instead the signature slip is referenced by an internal slip number 110.

The cardholder goes on to complete whichever signature slip they are presented with at step 76 or step 78, respectively, of the authorisation process 60. In the case of the signature slip 100, the cardholder can specify the total amount 104 that they wish to pay prior to authorisation being sought from their acquirer. The signature provided by the cardholder is compared to the one displayed on the payment card at step 80 for both modes of operation.

On returning to the EFTPOS terminal 62 with the completed signature slip, the terminal operator accesses the payment transaction details from the payment transaction database 48. For both modes of operation at step 82 the EFT processing engine 46 prompts the terminal operator, via the output display screen 44, to confirm whether the signatures matched. The terminal operator answers using the operator input device 42. If the signatures are judged not to have matched, in either state of operation, then at step 84 the EFT processing engine 46 deletes the transaction details from the payment transaction database 48 and the authorisation process 60 is ended prematurely.

Alternatively, if the cardholder's signature is judged to be valid then the EFT processing engine 46 begins the third stage of the authorisation process 60, whereby authorisation for the payment transaction is sought from the relevant acquirer host terminal 34. When the EFTPOS terminal 32a is in gratuity mode, the EFT processing engine 46 prompts the terminal operator at step 86 to enter the total amount 104 indicated by the cardholder on the signature slip 100. The EFT processing engine 46 then accesses the transaction details in the payment transaction database 48 and overwrites the stored sale amount with the total amount 104.

The processing for the two different modes of operation then converges at step 88, when the EFT processing engine 46 obtains the transaction details from the payment transaction database 48. This information, together with the merchant ID, is sent to the appropriate acquirer host terminal 34 as an authorisation request. As a security measure, a message authentication block is added to the end of the data, such that if the data is tampered with or is inadvertently distorted during transmission, it will be evident to both the acquirer host terminal and the payment terminal (this is a well known technique). The information read from the payment card at step 62 will have included the international identification number, namely the leading digits of the card's primary account number, which is used to identify the card issuer in accordance with ISO standards; this number determines which acquirer host terminal 34 is contacted.

Returning to FIG. 2, the EFT processing engine 46 accesses the EFT networks 36 via its modem 50 and establishes a communications link 38 between the EFTPOS terminal 32a and the appropriate acquirer host terminal 34 (in FIG. 2 this is ACQUIRER 1). The information is then transmitted in accordance with the local standard for enabling on-line authorisation and exchange of transaction data between the merchant and acquirer host terminals at the time of the transaction (in the UK this standard is APACS 40).

On receiving the authorisation request, the acquirer host terminal 34 authenticates it and accesses the cardholder's account to check the validity of the payment card and to determine if sufficient funds are available. An authorisation response, containing an authorisation code which indicates whether the transaction is accepted or rejected, is then generated by the acquirer host terminal 34 and transmitted back to the EFT processing engine 46 via the communications link 38.

Figure 4:
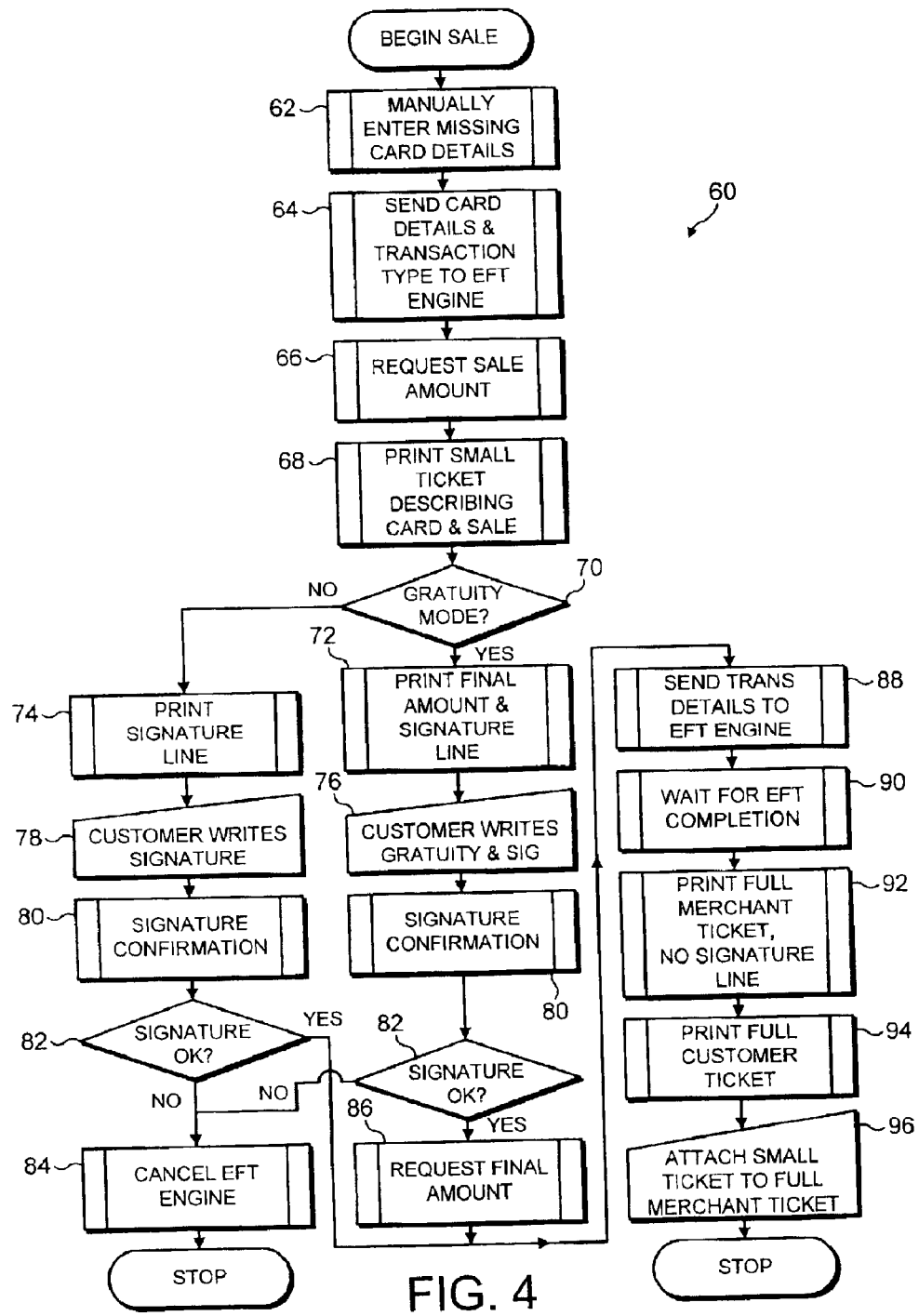
FIG. 4 is a flow diagram showing the steps involved in obtaining authorisation for an electronic payment transaction, according to the first embodiment of the invention.
Figure 7:
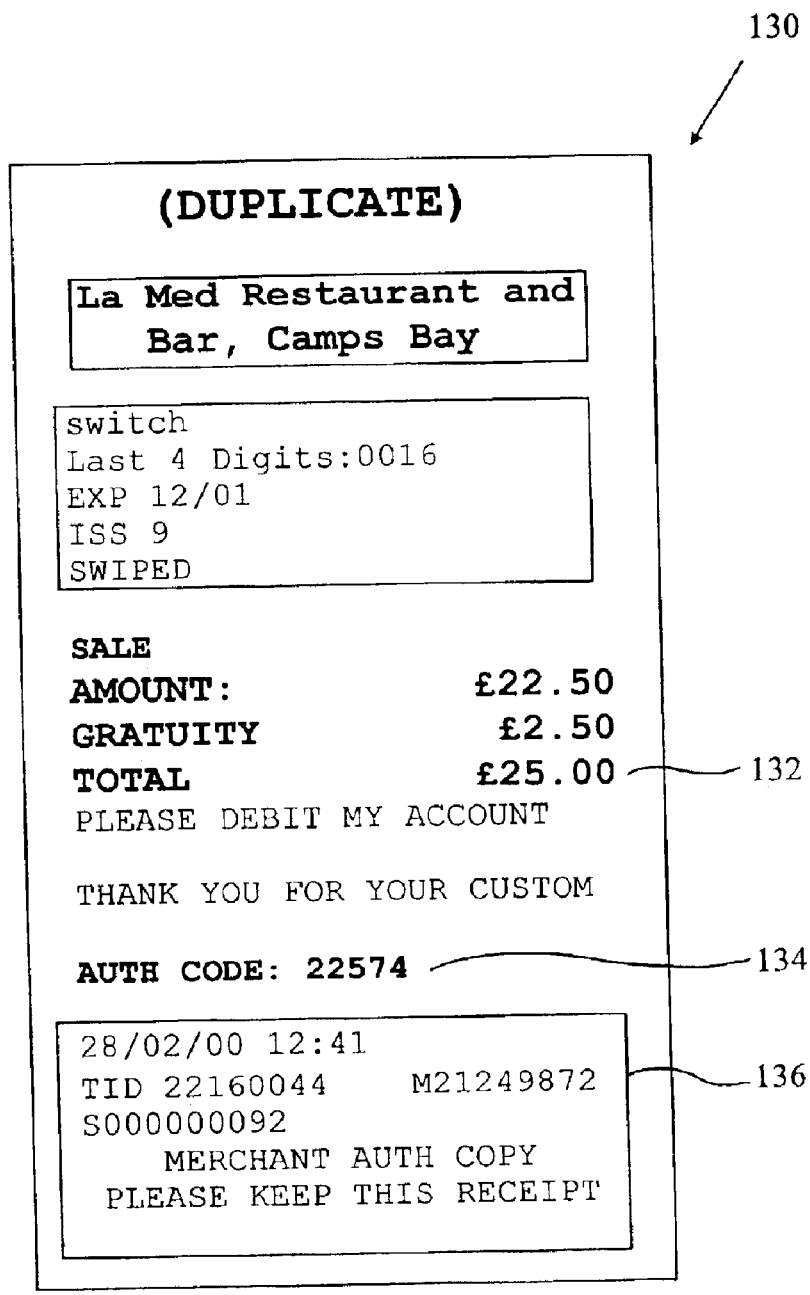
FIGS. 7 and 8 are plan views of authorised payment transaction receipts which have been produced in accordance with presently described embodiments of the invention.
Figure 8:
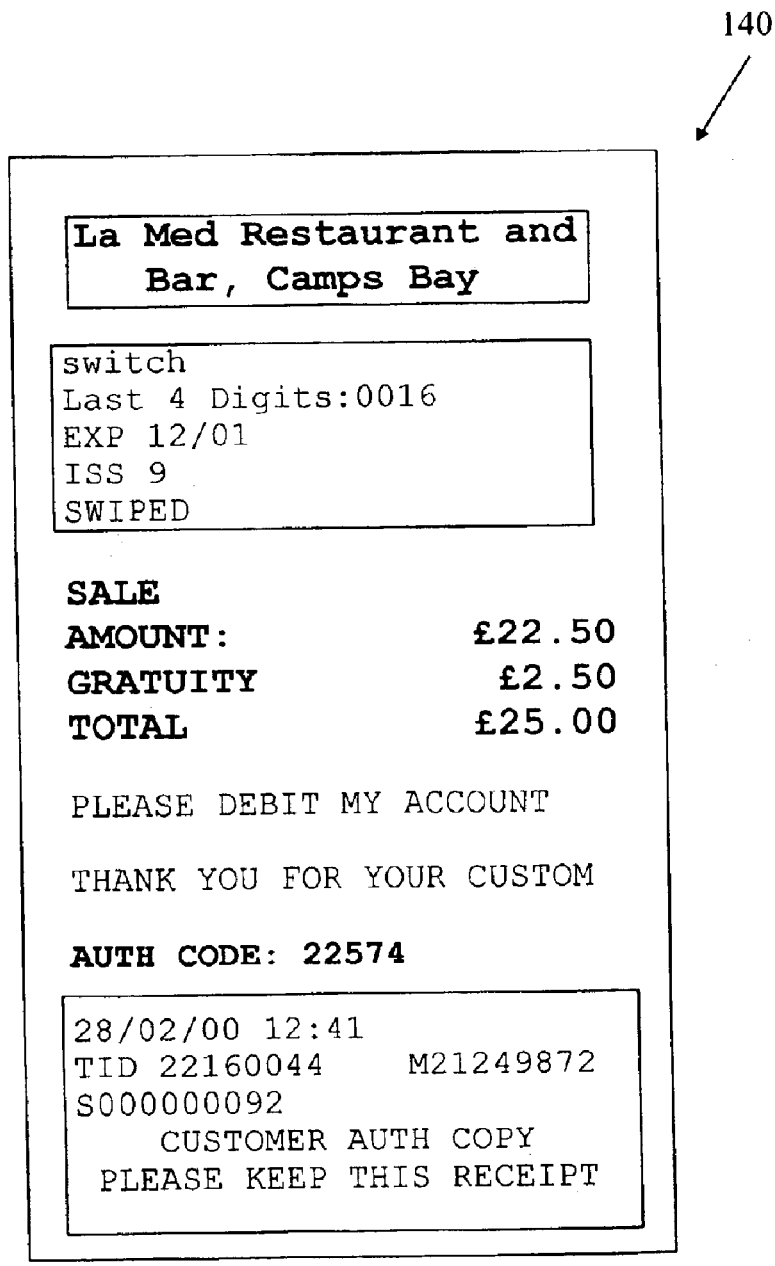

Meanwhile in the authorisation process 60 of FIG. 4, at step 90, the EFT processing engine 46 has been awaiting a response to its authorisation request. On receiving a response, it closes the communications link 38, authenticates the response, extracts the authorisation code and prompts the printer 52 to print off two authorised transaction receipts: one for the merchant as shown in FIG. 7 and one for the cardholder as shown in FIG. 8. At step 92 the merchant receipt 130, or "full merchant ticket", is generated and is clearly marked as a duplicate copy. This receipt confirms the amount 132 to be paid in the payment transaction, as indicated previously in either the total field 104 (gratuity mode) or the total field 122 (non-gratuity mode), and quotes the authorisation code 134 under which the acquirer host terminal 34 has authorised payment.

A copy of the authorised transaction receipt 140 which is to be retained by the cardholder is printed at step 94.

Finally, at step 96 of the authorisation process 60, the signature slip 100 or 120 which has been completed by the cardholder is attached to the merchant receipt 130. This is retained by the merchant for future reference.

Following the conclusion of the authorisation process 60, the cardholder can leave the merchant premises knowing that authorisation has been given for the total amount of the payment transaction and all processing to be performed at the merchant premises has been completed.

The second presently preferred embodiment of the invention will now be described with reference to FIGS. 9 and 10. This embodiment demonstrates how the invention may be implemented using a EFTPOS "base" terminal which communicates with a plurality (five in this embodiment) of portable handsets by means of radio communication. The handsets have a range of up to 100 metres and can be brought to the cardholder, so a cardholder need never lose sight of their payment card during a payment transaction, providing a high level of security. However, prior to the present invention, it has been necessary to establish a communications link between an EFTPOS "base" terminal and the relevant acquirer host terminal each time authorisation is sought. Establishing a communications link is the most time-consuming part of a payment transaction, with the time taken for data transmission being so short as to be almost inconsequential. Therefore, in addition to demonstrating how the security of payment transactions, made via portable handsets and an EFTPOS "base" terminal, can be improved, the following embodiment also shows how the processing time for such transactions may be reduced.

Figure 9:
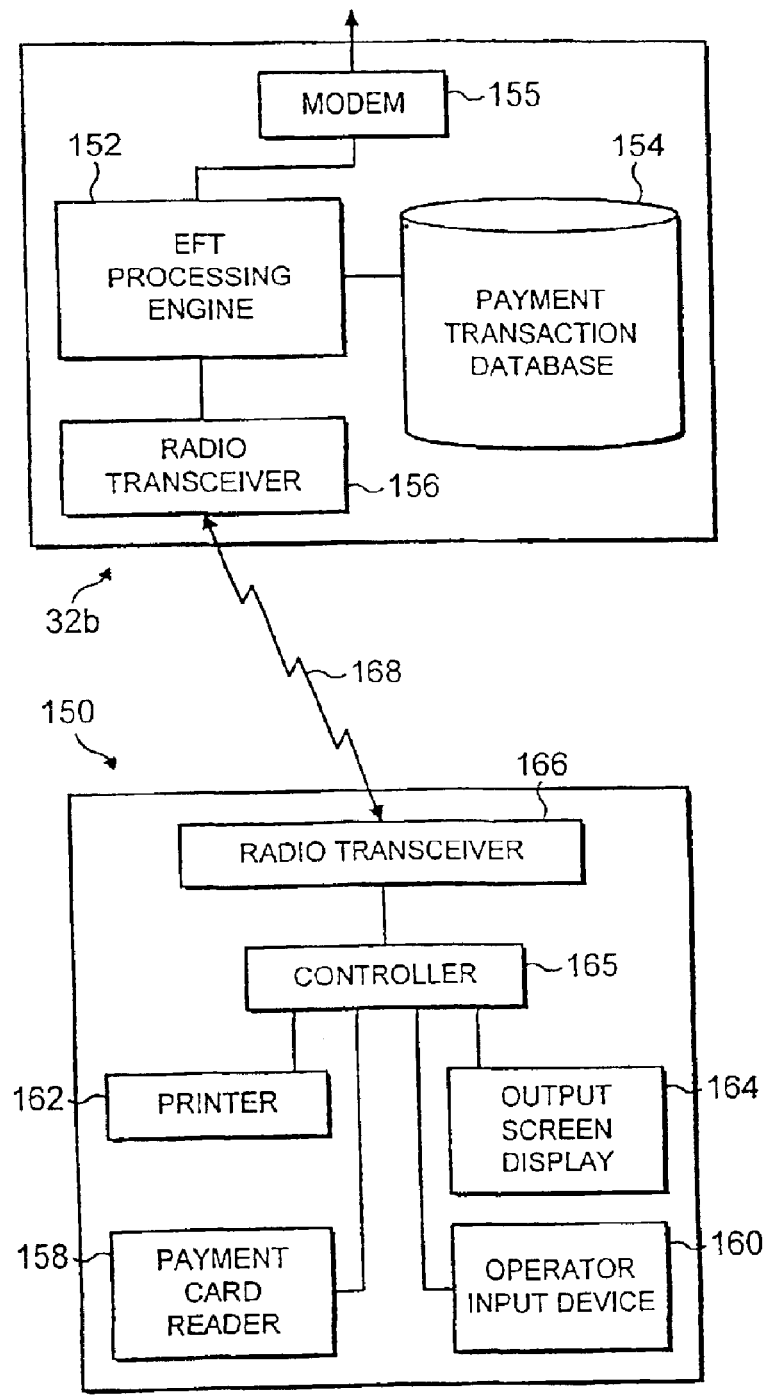
FIG. 9 is a schematic block diagram showing a merchant EFTPOS terminal as featured in the authorisation system of FIG. 2 together with a portable handset, according to a second embodiment of the invention.
Figure 10:
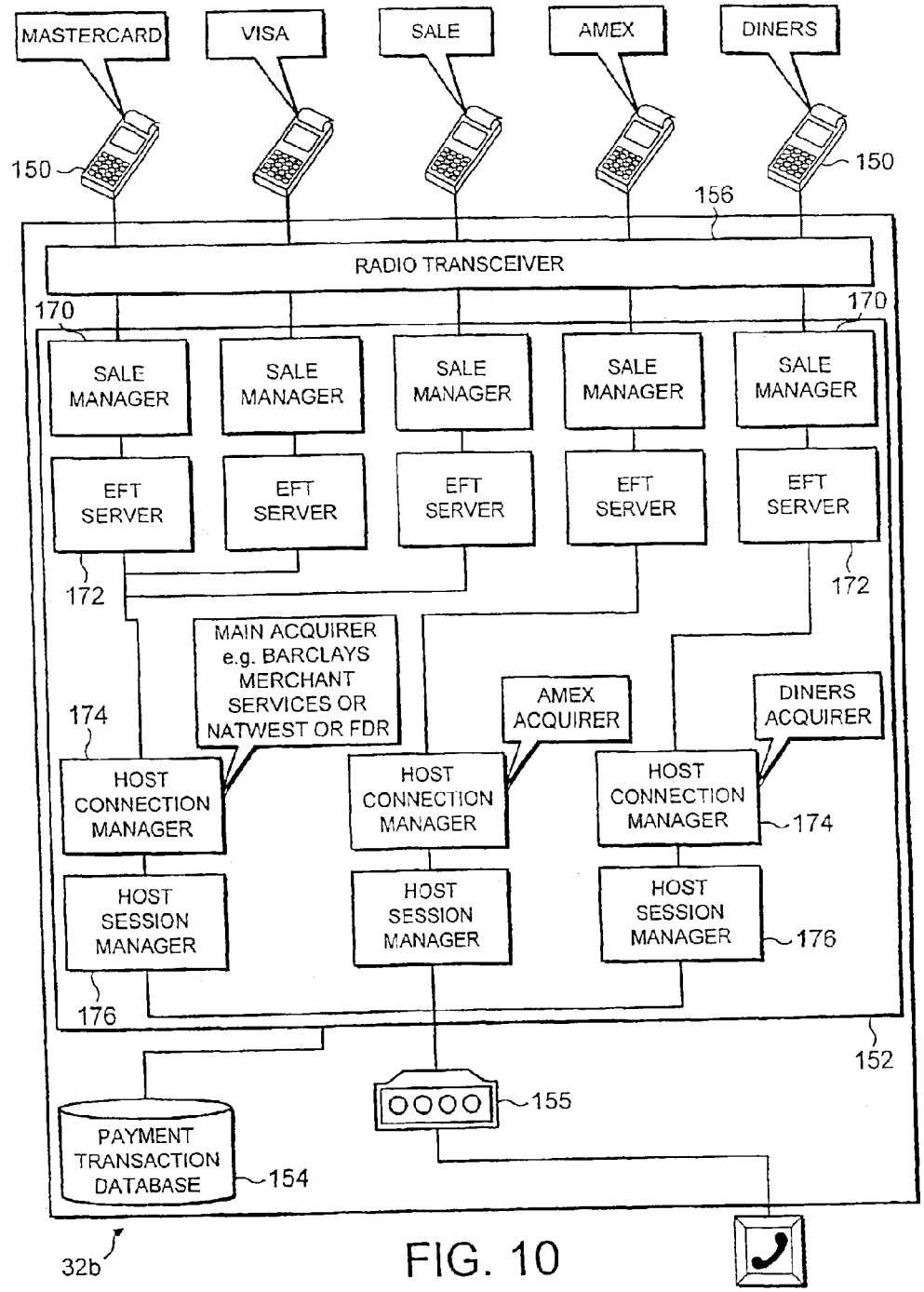
FIG. 10 is a schematic block diagram showing the merchant EFTPOS terminal of FIG. 9, and the processing modules created by its EFT processing engine, when in communication with five portable handsets.

FIG. 9 shows a merchant EFTPOS "base" terminal 32b accompanied by a single portable handset 150, although it is to be appreciated that five handsets 150 are supported by the terminal at any one time. The EFTPOS "base" terminal 32b is suitable for use in the authorisation system 30 shown in FIG. 2. However, it differs from the previously described EFTPOS terminal 32a of FIG. 3, in that it is comprised only of an EFT processing engine 152 and a payment transaction database 154, together with a radio transceiver 156. The remaining elements found in the EFTPOS terminal 32a are housed in the portable handset 150, namely being a payment card reader 158, an operator input device 160, a printer 162 and an output display screen 164. The portable handset 150 additionally features a controller 165, to which all of the other elements are connected and which controls their functionality (in the first embodiment this control processing was performed directly by the EFT processing engine 46), and a radio transceiver 166, enabling it to communicate with the EFTPOS "base" terminal 32b via a radio communications link 168.

The steps required for effecting payment via a portable handset 150 are similar to those outlined in the authorisation process 60 of FIG. 4, for the first embodiment, and so only the differences are described in detail hereafter. Payment card details and a sale amount are entered into a portable handset 150 rather than the EFTPOS terminal itself, with the handset being held in close proximity to the payment cardholder. After communicating with the EFTPOS "base" terminal 32b, the portable handset 150 produces a transaction signature slip as shown in FIG. 5 or FIG. 6, but with two additional data fields included in the additional information 108. The first data field relates to an identification number for the handset and the second to an internal count of the transactions processed by the handset. The cardholder completes the transaction signature slip, indicating the total amount that is to be paid. The operator of the portable handset 150 then enters the total amount into the portable handset 150, using the operator input device 160. This information is then transmitted to the EFT processing engine 46 at the EFTPOS "base" terminal 32b. Only at this stage, when the total amount to be paid has been determined, is authorisation sought for the payment transaction. The authorised transaction receipts that are produced are similar to those shown in FIGS. 7 and 8, but they again contain the two additional data fields mentioned above, plus a further data field for an internal count of the authorisations obtained.

A key difference between the two embodiments occurs at step 88 in the authorisation process 60 of FIG. 4, when the transaction details are sent to the EFT processing engine 152. Unlike the first embodiment, where payment transactions are processed one at a time, the EFT processing engine 152 can process multiple sets of payment transaction details simultaneously. Each set of details received is streamed according to the acquirer host terminal 34 from which authorisation must be sought; the details are then placed in a queue until a communications link 38 to that acquirer host terminal 34 becomes available. As in the first embodiment, the EFTPOS "base" terminal 32b is only in communication with a single acquirer host terminal 34 at any one time. However, in the second embodiment requests for authorisation are effectively strung together, so that all queued transaction details for that acquirer host terminal 34 are sent prior to the communications link 38 being closed down. By stringing transaction authorisation requests together, delays associated with having to repeatedly establish communications links 38 can be avoided.

In order to process multiple sets of payment transaction details, the EFT processing engine 152 employs four different types of processing module: Sale Manager, EFT Server, Host Connection Manager and Host Session Manager. FIG. 10 shows an EFTPOS "base" terminal 32b in communication with five portable handsets 150; it also shows various instances of the processing modules which have been created by the EFT processing engine 152. The key functionality of each module/instance is briefly summarised below.

Whenever the EFT processing engine 152 receives payment card details from a portable handset 150 (at step 64 in FIG. 4), it creates an instance 170 of the Sale Manager module. This module is concerned with the processing of payment card and transaction data and with storing information in the payment transaction database 154. In addition, each Sale Manager instance 170 oversees communication with the portable handset 150 with which it is associated, such as requesting a sale amount and issuing instructions to the handset's on-board printer 162.

Each Sale Manager instance 170, in turn, creates an instance 172 of an EFT Server module. EFT Server instances 172 request connection to a communications link 38 with the host terminal 34 of the acquirer for that particular stream; they also perform any authentication tasks that are required to support the APACS 40 protocol.

Each request for connection is sent to an appropriate instance 174 of a Host Connection Manager module. Each instance 174 of a Host Connection Manager module is a finite state machine, such that the instance may be in one of several predetermined finite states. Only one instance of this module exists per stream i.e. per acquirer host terminal 34. When the EFT processing engine 152 receives a set of payment card details, it notes the acquirer host terminal 34 from which authorisation must be sought and creates an instance 174 of a Host Connection Manager module if one does not already exist. Each Host Connection Manager instance 174 maintains a queue of connection requests received from its associated EFT Server instances 172 and decides to which of these instances 172 the communications link 38 should be allocated.

Management of the communications link 38, itself, is handled by an instance 176 of a Host Session Manager module. This module is concerned with initiating and terminating communications links 38 in compliance with national standards. The EFT processing engine 152 creates an instance 176 of a Host Session Manager module for every Host Connection Manager instance 174. As can be seen from FIG. 10, each Host Session Manager instance 176 contacts its designated acquirer host terminal 34 through a shared communications resource, namely a modem 178.

Further to payment transaction details being streamed by the EFT processing engine 152, the reduction in payment transaction processing time is achieved by the queuing and stringing of these details as performed by instances 174 of the Host Connection Manager module. The processing conducted by the Host Connection Manager instances 174 will now be described. In what follows, instances of the EFT Server module, the Host Connection module and the Host Session Manager module will be referred to as EFT Servers 172, Host Connection Managers 174 and Host Session Managers 176, respectively.

When an EFT Server 172 terminates its connection with a communications link 38, the associated Host Connection Manager 174 allocates the link to the next EFT Server 172 awaiting connection. Alternatively, if its queue for connection requests is empty, the Host Connection Manager 174 instructs the Host Session Manager 176 to terminate the communications link 38. Another Host Session Manager 176 can then access the modem 178 and establish a new communications link 38 with a different acquirer host terminal 34. This processing is explained in more detail below.

An EFT Server 172 can send the following messages to its Host Connection Manager 174: "CONNECT", "TRANSMIT" and "DISCONNECT". The "CONNECT" message is sent after the EFT processing engine 152 has received both the payment card details and the total amount to be paid from a portable handset 150; this message informs the Host Connection manager 174 that the EFT Server 172 requires connection with a communications link 38 to the appropriate acquirer host terminal 34. The "TRANSMIT" message is sent after the Host Connection Manager 174 informs the EFT Server 172 that it is connected to the communications link 38 and causes the payment transaction details to be transmitted to the acquirer host terminal 34. Finally, the "DISCONNECT" message is issued when the EFT Server 172 has received authorisation for the payment transaction from the acquirer host terminal 34, or when the portable handset operator has terminated the transaction prematurely.

A Host Connection Manager 174, which as mentioned earlier is a finite state machine, can be in one of three states when it receives these messages: IDLE, WAITING_CONNECTION or IN_CONNECTION. The detection of each message received is referred to as an "event". The response of a Host Connection Manager 174 to an event is dependent upon what state it is in when the message is received. The various processes performed by a Host Connection Manager 174 in response to messages received in each of the IDLE, WAITING_CONNECTION and IN_CONNECTION states are shown, respectively, in FIGS. 11, 12 and 12a, and 13 and 13a.

Host Connection Managers 174 are in the IDLE state when not in, or attempting to make, connection with an acquirer host terminal 34. Hence, this represents the initialised state of a Manager when its queue for connection requests is empty. A Host Connection Manager 174 is also placed in this state when repeated attempts to establish a communications link 38 have failed as a result of network communication problems. The processing performed by a Host Connection Manager 174 in the IDLE state will now be discussed with reference to FIG. 11.

When a Host Connection Manager 174 receives a "CONNECT" message from one of its EFT Servers 172, it executes a "CONNECT" response process 190. After detecting the message at step 192, the Host Connection Manager 174 updates its state to "WAITING_CONNECTION" at step 194; it then instructs the Host Session Manager 176, at step 196, to establish a communications link 38 with the designated acquirer host terminal 34. The process 190 is terminated at step 198, when all of the necessary processing to be performed by the Host Connection Manager 174 has been completed.

Any other events detected by a Host Connection Manager 174 in the IDLE state are dealt with by an error handling process 200. Any unexpected message is detected at step 202 and sent to an instance of an error recovery module at step 204; the instance then deals with the event in a predetermined manner.

Figure 12:
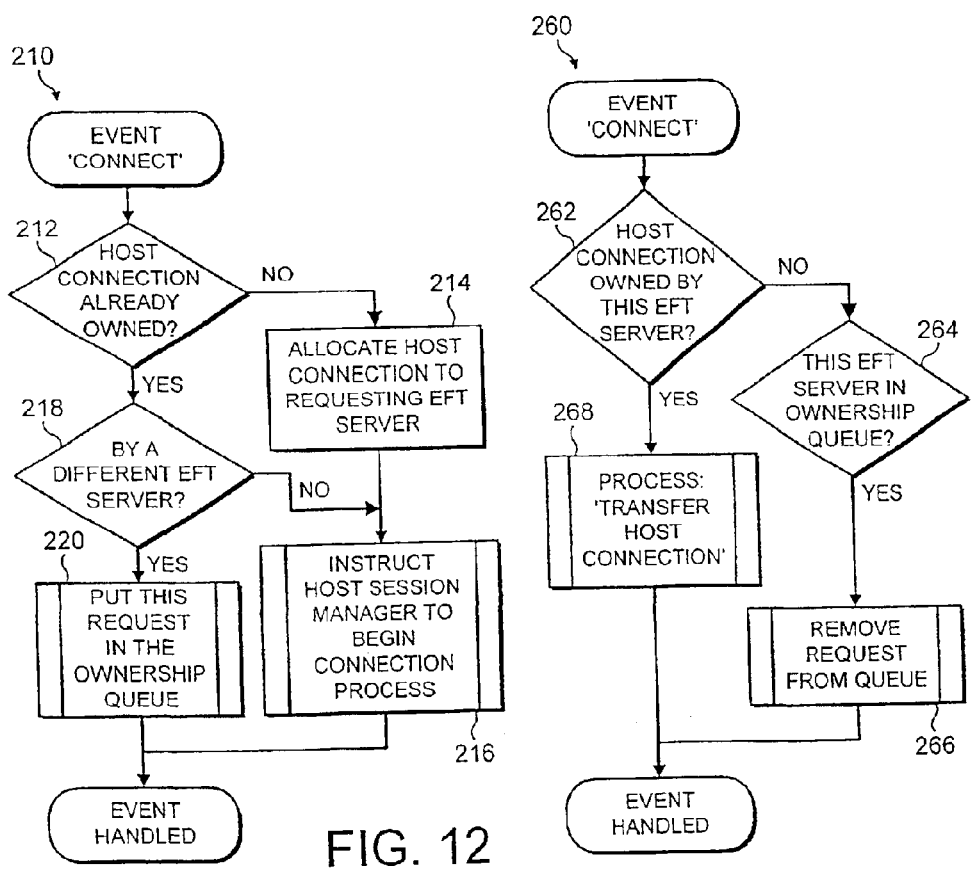
FIGS. 12 and 12a are a series of flow diagrams showing the processing performed by a Host Connection Manager of FIG. 10 in response to various events when it is in a WAITING_CONNECTION state.
Figure 12:
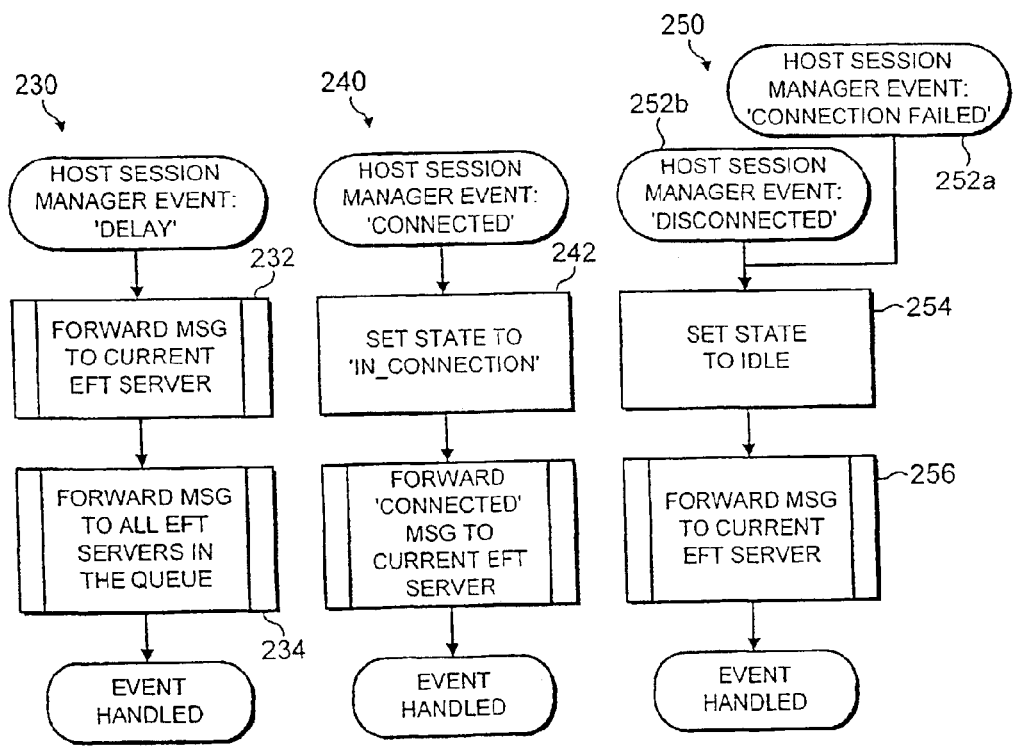
Figure 12A:
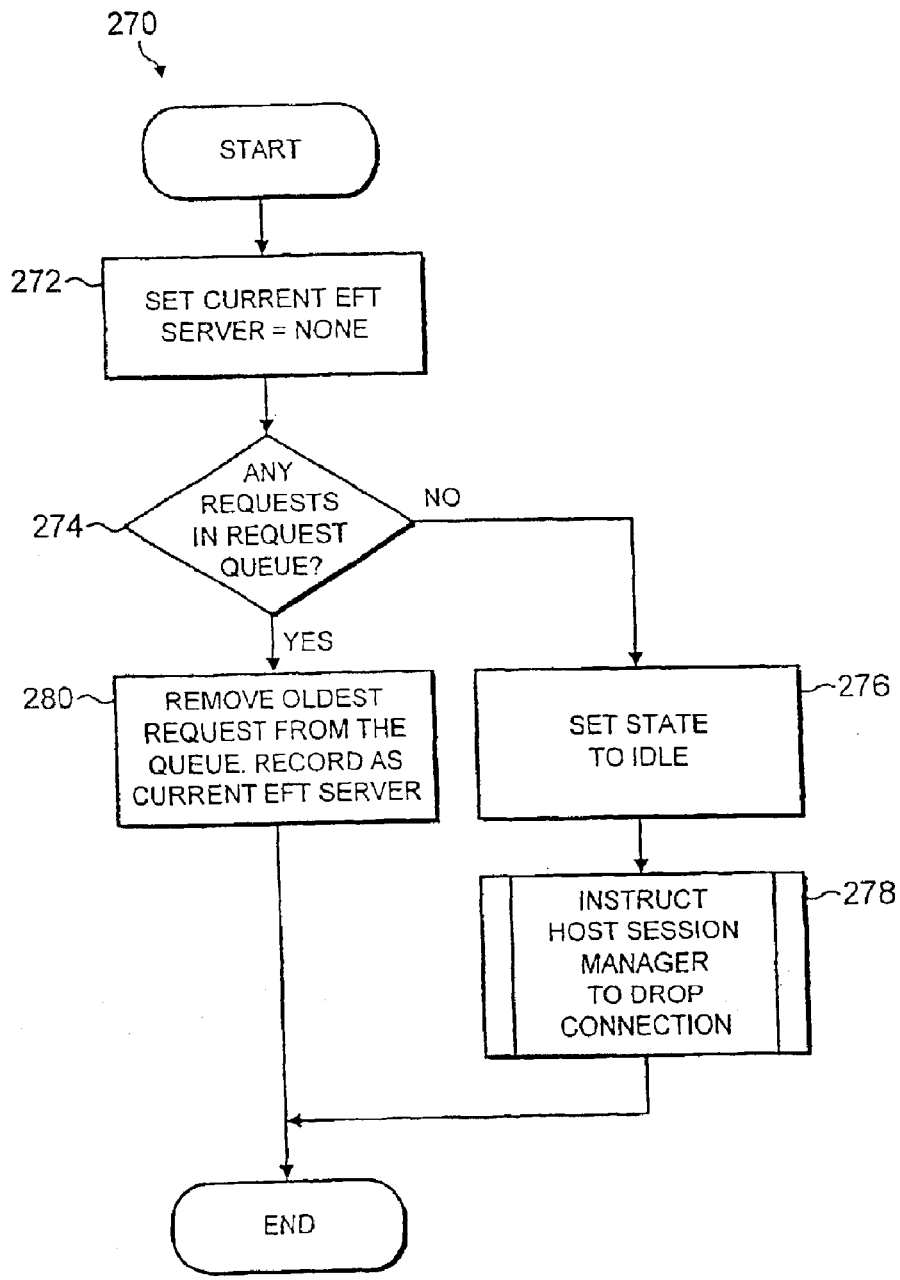
Figure 13:
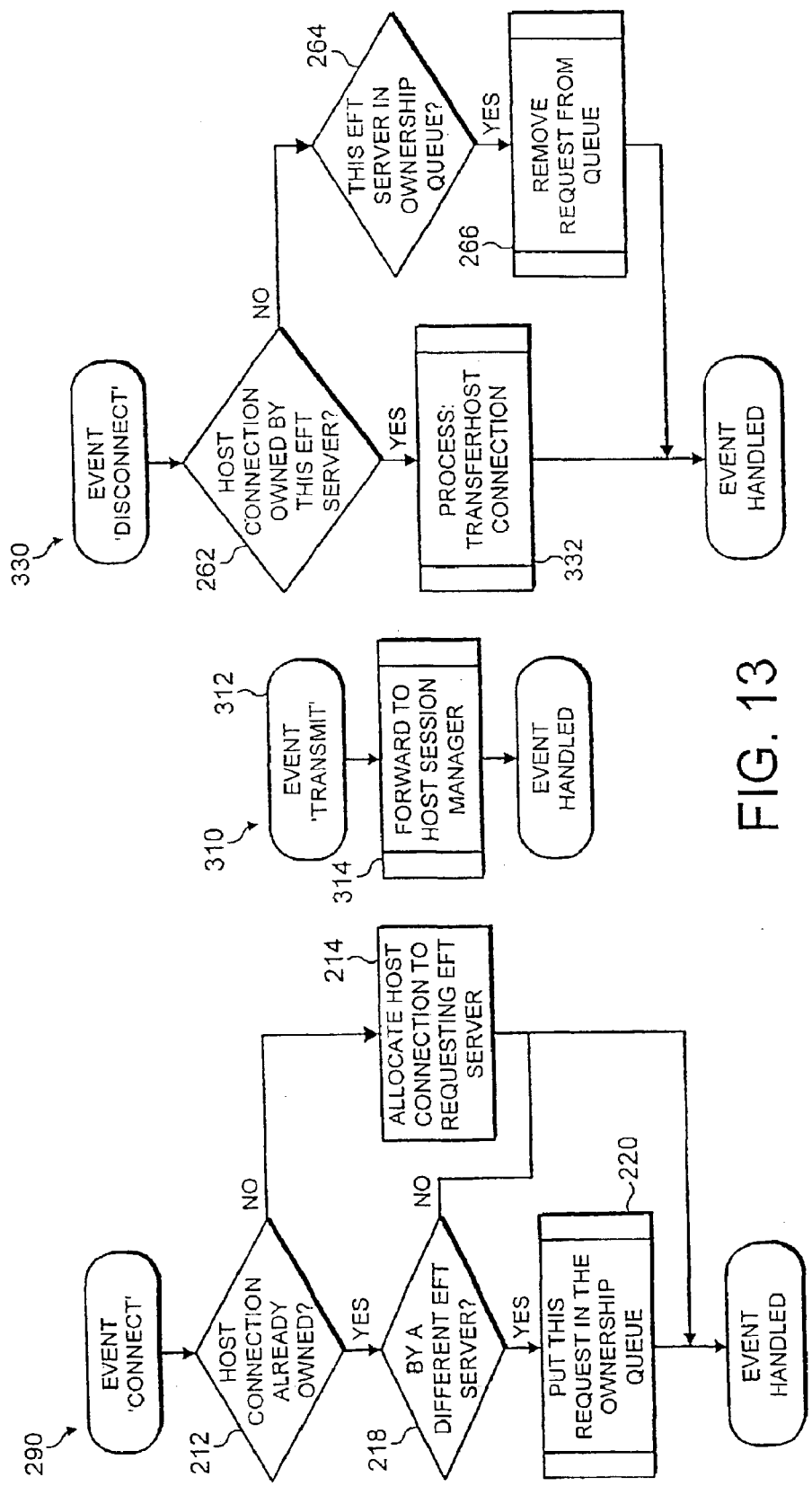
FIGS. 13 and 13a are a series of flow diagrams showing the processing performed by a Host Connection Manager of FIG. 10 in response to various events when it is in an IN_CONNECTION state.
Figure 13:
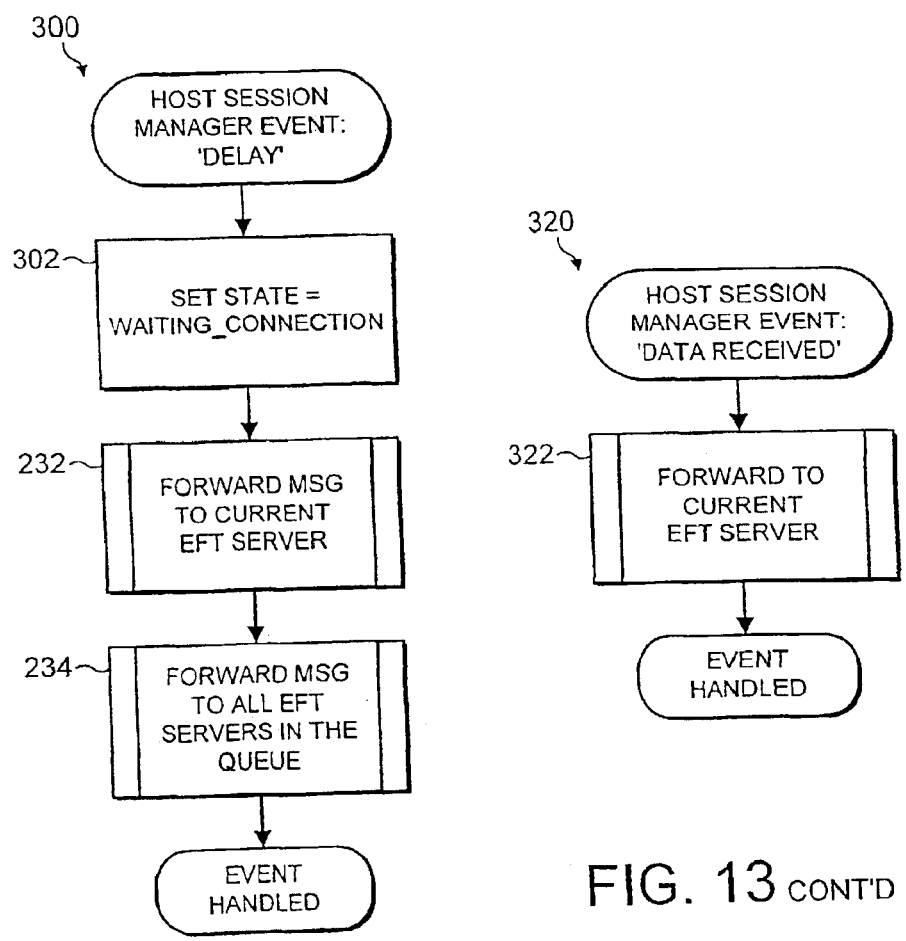
Figure 13A:
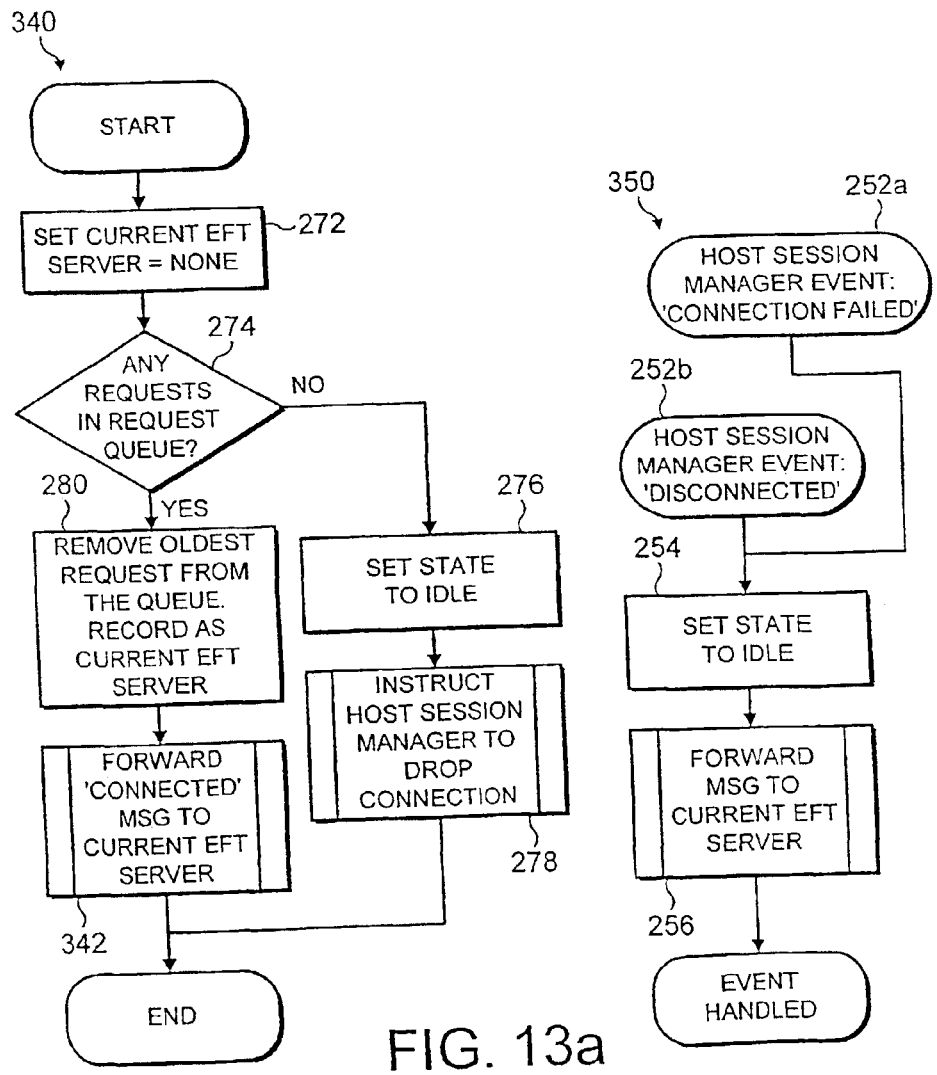

If a Host Connection Manager 174 is already in the WAITING_CONNECTION state when it receives a "CONNECT" message from one of its EFT Servers 172, it executes a "CONNECT" response process 210 as shown in FIG. 12. The Host Connection Manager 174 checks at step 212 to see if a communications link 38, or "Host Connection", is currently assigned to one of its EFT Servers 172. If this is not the case then the Host Connection Manager 174 allocates the link to the requesting EFT Server 172 directly, at step 214, by setting it as the "current EFT Server". However, the communications link 38 has not yet been instigated and so at step 216 the Host Connection Manager 174 instructs the Host Session Manager 176 to commence the connection process.

If the communications link 38 has already been allocated to a particular EFT Server 172 then the Host Connection Manager 174 checks to see whether it has received a repeat "CONNECT" message from the same EFT Server 172 (a message may be sent periodically from a requesting EFT Server 172 until confirmation of connection is received). The Host Connection Manager 174 performs this check at step 218 and, if necessary, repeats its earlier instruction to the Host Session Manager 176 at step 216. Otherwise, the request for connection to a communications link 38, which has already been allocated to another EFT Server 172, is placed into a queue by the Host Connection Manager 174 at step 220.

Further to instructing its Host Session Manager 176 at step 216, a Host Connection Manager 174 may receive one of the following messages in reply: "DELAY", "CON- NECTED" or "CONNECTION FAILED". When a Host Connection Manager 174 is informed of a delay in the connection process, it executes a "DELAY" response process 230-passing the message on to all of its associated EFT Servers 172 at steps 232 and 234. When the Host Connection Manager 174 receives a message "CONNECTED", informing it that connection with the acquirer host terminal 34 has been successfully achieved, it responds via the "CONNECTED" response process 240. In this process, the Host Connection Manager 174 updates its state to "IN_CONNECTION" at step 242, before notifying the EFT Server 172 to which the communications link 38 has been allocated of its successful connection to the link.

If attempts by the Host Session Manager 176 to create a communications link 38 fail, then the Host Connection Manager 176 responds via the appropriate branch of process 250. Further to receiving a message "CONNECTION FAILED" at step 252a, the Host Connection Manager 174 resets its state to "IDLE" at step 254 and then, at step 256, forwards the message to the EFT Server 172 to which the link was allocated.

Figure 11:
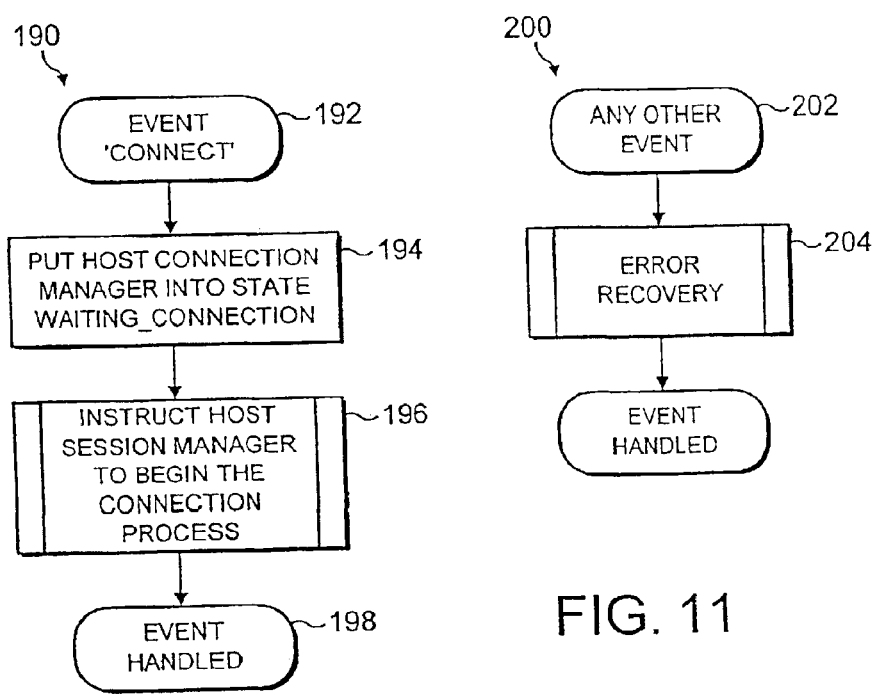
FIG. 11 is a series of flow diagrams showing the processing performed by a Host Connection Manager of FIG. 10 in response to various events when it is in an IDLE state.

A "DISCONNECT" response process 260 is executed by a Host Connection Manager 174 when it detects a "DISCONNECT" message from one of its EFT Servers 172. The Host Connection Manager 174 checks, at step 262, to see whether the communications link 38 has been allocated to the EFT Server 172 which issued the message. If this is not the case, then the Host Connection Manager 174 makes a further check, at step 264, to see if it has received a request from the EFT Server 172 for connection to the communications link 38. Any request that has been made is removed from the request queue by the Host Connection Manager 174 at step 266. Alternatively, if a spurious "DISCONNECT" message has been received which does not have a counterpart in the queue for connection requests, then the error handling process 200 of FIG. 11 is employed (not shown in process 260). However, if following step 262, it is found that the communications link 38 is allocated to the EFT Server 172 which sent the "DISCONNECT" message, then the Host Connection Manager 174 checks to see if the allocation can be transferred to another EFT Server 172 which has requested connection. It does this by executing, at step 268 in process 260, a Transfer Host Connection process 270 which is now described in detail with regard to FIG. 12a.

The Transfer Host Connection process 270 begins by cancelling allocation of the communications link 38 at step 272, when the Host Connection Manager 174 resets the "current EFT Server" variable to "NONE". The Host Connection Manager 174 then checks its queue of connection requests at step 274. If the queue is empty then the Host Connection Manager 174 resets its state to IDLE at step 276 and instructs the Host Session Manager 176 to terminate the communications link 38 at step 278. Alternatively, if further EFT Servers 172 are awaiting connection to the communications link 38, then the Host Connection Manager 174 edits the queue as indicated at step 280. It identifies the oldest request, removes that request from the queue and sets the EFT Server 172 which made that request as the "current EFT Server". Accordingly, there is no need to terminate the existing attempt at communication with the acquirer host terminal 34.

Finally, a Host Connection Manager 174 in the WAITING_CONNECTION state will respond via process 250 of FIG. 12 if it receives a message "DISCONNECTED" from the Host Session Manager 176 at step 252b.

Any other events that are detected by a Host Connection Manager 174 when it is in the WAITING_CONNECTION state are handled by an error handling process 200 as shown in FIG. 11.

Once a Host Session Manager 176 has established a communications link 38 with an acquirer host terminal 34, its Host Connection Manager 174 will be in the IN_CONNECTION state. The responses of a Host Connection Manager 174 in this state are those set out in FIGS. 13 and 13a.

When a Host Connection Manager 174 receives a "CONNECT" message, it executes the "CONNECT" response process 290. This process is identical to the "CONNECT" response process 210 of FIG. 12, except that the instruction to commence connection at step 216 in the latter process 210 is omitted in the present process 290 on account of the present state of the Host Connection Manager 174.

If a Host Connection Manager 174 receives a message from its Host Session Manager 176, informing it that the communications link 38 is subject to a "DELAY", then it executes the "DELAY" response process 300. Again, this process 300 is identical to the "DELAY" response process 230 shown in FIG. 12 conducted under the WAITING_CONNECTION state, except for the inclusion of an additional step 302 whereby the state of the Host Connection Manager 174 is reverted to WAITING_CONNECTION.

Further to an EFT Server 172 receiving a "CONNECTED" message as a result of process 240, it sends a "TRANSMIT" message to its Host Connection Manager 174 causing the Host Connection Manager 174 to execute a "TRANSMIT" response process 310. After receiving the message at step 312, the Host Connection Manager 174 instructs the Host Session Manager 176 to send the payment transaction data as an authorisation request to the acquirer host terminal 34 at step 314.

When a Host Session Manager 176 receives a response to an authorisation request from its designated acquirer host terminal 34, it sends a message "DATA RECEIVED" to its Host Connection Manager 174, causing the execution of a "DATA RECEIVED" response process 320. The message is forwarded to the "current" EFT Server 172 at step 322, indicating the conclusion of communication with the acquirer host terminal 34 for that particular the payment transaction.

Accordingly, the EFT Server 172 then sends a "DISCONNECT" message which triggers the "DISCONNECT" response process 330. This process is identical to the "DISCONNECT" response process 260 outlined in FIG. 12. However, the Transfer Host Connection process 340 shown in detail in FIG. 13a and called at step 332 differs from the equivalent Transfer Host Connection process 270 which is executed under the WAITING_CONNECTION state. An additional step 342 appears in process 340, whereby when the communications link 38 has been allocated to a new EFT Server 172, the Host Connection Manager 174 also sends a message to that EFT Server 172 informing it that it is "CONNECTED". The newly connected EFT Server 172 may then send a "TRANSMIT" message back to its Host Connection Manager 174, thereby leading to stringing of payment transaction authorisation requests.

Further to instructing its Host Session Manager 176 to drop a communications link 38 in the event of an empty EFT Server queue, a Host Session Manager 174 will receive a "DISCONNECTED" message when the link has been terminated. It then executes a response process 350, also shown in FIG. 13a, which is identical to the process 250 of FIG. 12, such that the Host Connection Manager 174 responds in the same manner as that described previously when it is informed that a connection attempt has failed.

As for the previous states, the detection of any other message causes an error handling process 200 to be invoked, as shown in FIG. 11.

By processing payment transaction details in this way, namely by streaming them, queuing them and then stringing them together, the EFT processing engine 152 can help to reduce the time taken to obtain authorisation. Cardholders are therefore less likely to suffer an onerous delay and can proceed about their business quickly.

Having described particular preferred embodiments of the present invention, it is to be appreciated that the embodiments in question are exemplary only, and that variations and modifications, such as those that will occur to those possessed of the appropriate knowledge and skills, may be made without departure from the spirit and scope of the invention as set forth in the appended claims. For example, rather than storing information which can be used to invoke payment from an issuer on a plastic payment card, the information could be held on another device which is not solely dedicated to that purpose. Details of a person's payment account could be stored electronically on their mobile phone or personal electronic organiser, or, say, a key ring fob which has been configured to store electronic data. The details could then be transferred wirelessly, say, to a merchant's portable handset by means of the Bluetooth communications protocol or, alternatively, some physical connection could be employed permitting the details to be downloaded from the customer's portable handheld electronic device. Similarly, the card details could be conveyed verbally to the operator and keyed into the terminal (this approach would be less secure because of the lack of local security checks). In this way, the payment card reader used in the two embodiments described above would effectively be redundant.

Although a customer is generally informed of an outstanding amount that is to be paid prior to their deciding on whether to make a gratuity payment, the way in which the outstanding amount is communicated need not be restricted to presenting the customer with a paper bill. The outstanding amount could merely be communicated verbally, or alternatively it could be presented to the customer via a display screen on board a portable handset, for example. The customer could then either (1) indicate a gratuity that they wished to pay in addition to the outstanding amount or (2) indicate a gratuity and a confirmation of the total amount that is to be paid or (3) only indicate a total amount that is to be paid. Rather than providing the customer with a transaction signature slip, indication by the customer could take the form of, say, entering the amount(s) into a personal portable electronic device, the device being arranged to transmit the entered information wirelessly to the merchant's portable handset; in this way the customer could keep an up-to-date log of the expenditure from their payment account on their portable electronic device. Alternatively, the customer could key the amount(s) that they wish to pay directly into a merchant portable handset or they could just communicate verbally the amount(s) to the portable handset operator who would then enter the information manually into the handset on their behalf.

A transaction signature slip could, of course, take a virtual form if a merchant's portable handset is fitted with a touch screen display, permitting the customer to indicate a gratuity and/or final amount that is to be paid and sign their signature directly onto the display screen. A digital recording of the signature could then be stored electronically and submitted to the acquirer along with the rest of the transaction information. In addition, where portable handsets are used, rather than relying on signature verification to check that a person offering a payment card for settlement is in fact the authorised cardholder, a system employing biometrics could be introduced. A digital image of the person's fingerprint, say, could be transmitted for verification to the acquirer host terminal along with the payment transaction details. Similarly, a cardholder could be required to enter a PIN (personal identification number) prior to the transaction details being sent for authorisation.

When communicating with an acquirer host terminal, in addition to conventional transmissions across public switched telephone networks, other types of communications such as those supported by the ISDN standard can be used. Alternatively, dedicated leased-lines may be employed to achieve the fastest rates of data transmission. Verbal communication with an acquirer may also be resorted to in the event of any network communication problems. Similarly, communication between portable handsets and an EFTPOST "base" terminal need not be restricted to radio waves—communication could also be readily achieved via other mobile, wireless or digital electronic cordless telephony systems. Another variation would be to provide a separate communications resource for every acquirer host terminal from which the merchant is willing to accept payment—so in the second embodiment described above, for example, a separate telephone line would need to be installed for each acquirer host terminal. Also, attempts to contact the acquirer host terminal can occur at any time after the details of a payment card (or other means) have been extracted, rather than conforming with conventional methods and waiting explicitly until a local security check (such as signature verification) has been performed.

A system of an EFTPOS "base" terminal and portable handsets could also be adapted such that if the power on one handset runs out whilst it is processing a payment transaction, the payment transaction can be picked up by another handset via communication with the base terminal.

In addition to what is described above for the second embodiment, it is also possible to enter the details of several payment cards into a portable handset consecutively. For example, if a group of six people in a restaurant decides to split a bill equally and each person wishes to pay their share using their own payment card, then a portable handset operator could swipe the six cards through one after the other, so that six instances of a Sale Manager module are created by the EFT processing engine. However, when issuing the resultant transaction signature slips back to the group for completion and signature, the handset operator would need to exercise care in marrying up the correct slip with the correct person. Similarly, in the first embodiment, the details of several payment cards could be entered into the EFTPOS terminal one after the other and processed concurrently, without waiting for the transaction signature slips to be printed off.

Receipts need not only take the form of paper slips—the information could be downloaded digitally from the merchant to the customer's own portable handheld electronic device.

The merchant's copy of the authorisation slip (see FIG. 7), need not be printed while the transaction is performed in front of the customer. Instead, this information can be printed as part of a report, giving details of all transactions which were authorised over a specified time period. The internal slip number 110 on the transaction signature slip (see FIG. 5) can be used to reference the authorisation code for the transaction as and when necessary.

Finally, an authorisation authority may introduce a minimum transaction amount, or so-called "floor limit", which needs to be exceeded in order to warrant an authorisation.

Typically, transactions less than £15 may be deemed to be of such small value as to make the associated risk of fraud insufficient to warrant an on-line authorisation. The point of using such a threshold is to reduce the number of authorisation requests being generated at any time to a manageable number. In this case, an EFT processing engine can be adapted to make an electronic decision as to whether authorisation need be sought in accordance with the merchant's floor limit specification. The processing of transaction data is further improved by allowing those transactions with values which fall below the floor limit to be authorised immediately without waiting for any online transactions to be first authorised.

What is claimed is:

1. A method of generating and handling an electronic online authorization and uploading request from a merchant relating to a payment transaction, the method comprising:
   receiving data relating to a customer's transaction card, and data relating to an original amount of the payment transaction;
   presenting the original amount data to the customer such that a gratuity amount is determined and, in response thereto, receiving data relating to the gratuity amount;
   constructing the electronic online authorization and uploading request, the request comprising all transaction data necessary for an acquirer to authorize the transaction and to completely upload the payment transaction for reconciliation to the merchant, and including identification of the merchant, the transaction card data and data relating to a value of the transaction, the transaction value comprising the gratuity amount and the original amount;
   establishing a link with the acquirer via a telecommunications network and seeking online authorization for the payment transaction by transmitting the constructed request; and
   generating and providing receipt data to the customer, the receipt data confirming authorization of the payment transaction at the transaction value when an electronic signal has been received specifying that the electronic online authorization and uploading request has been authorized.

2. A method according to claim 1, wherein the customer transaction card data is stored on a personal item of said customer, and the method further comprises obtaining the transaction card data from the personal item for the purposes of generating the electronic online authorization and uploading request.

3. A method according to claim 2, wherein the obtaining step comprises reading data stored on a magnetic strip of a customer's transaction card.

4. A method according to claim 2, wherein the obtaining step comprises reading data stored on an electronic chip of a customer's transaction card.

5. A method according to claim 2, wherein the obtaining step comprises using a data input device, such as a keyboard, for manually inputting data displayed on the personal item and converting the data into an electronic format.

6. A method according to claim 1, wherein the presenting step comprises outputting data in a humanly readable format.

7. A method according to claim 6, wherein the outputting step further comprises printing at least the original amount data onto a slip.

8. A method according to claim 6, wherein the outputting step further comprises displaying at least the original amount data on a display screen.

9. A method according to claim 1, further comprising obtaining further information from the customer regarding the transaction value.

10. A method according to claim 9, wherein the further information obtained is the gratuity amount and a transaction amount, the method further comprising checking that the transaction amount is the sum of the original amount and the gratuity amount and subsequently using the transaction amount as the transaction value.

11. A method according to claim 9, wherein the further information obtained is the gratuity amount, the method further comprising determining the transaction value by adding the gratuity amount to the original amount.

12. A method according to claim 9, wherein the further information obtained is a transaction amount, the method further comprising determining the gratuity amount by subtracting the original amount from the transaction amount.

13. A method according to claim 1, wherein the, receiving step comprises receiving data relating to the expiry date of the customer's transaction data card for transmission to the acquirer.

14. A method according to claim 1, wherein the establishing step is triggered by the occurrence of the receiving step and is carried out at least in part concurrently with the presenting and gratuity amount data receiving steps.

15. A method according to claim 14, further comprising creating one or more software session instances for electronic online authorization and uploading request, the software session instances controlling the receiving, presenting, constructing, establishing, transmitting, and generating and providing steps for the request.

16. A method according to claim 15, wherein there are a plurality of electronic online authorization and uploading requests to be processed and one or more software session instances are created for each request, the method further comprising implementing the receiving, presenting, constructing, establishing, transmitting, and generating and providing steps for the plurality of requests concurrently.

17. A method according to claim 1, wherein the establishing and transmitting steps are implemented using the APACS 40 standard format.

18. A method according to claim 1, wherein the generating and providing step comprises outputting compiled receipt data in a humanly readable format.

19. A method according to claim 18, wherein the receipt data outputting step further comprises printing the authorized transaction value data onto a slip.

20. A method according to claim 18, wherein the receipt data outputting step further comprises displaying the authorized transaction value data on a display screen.

21. A method according to claim 18, wherein the receipt data outputting step further comprises outputting an authorization code received from the acquirer confirming the authorization of the transaction when the electronic signal is received.

22. A method according to claim 1, further comprising storing the receipt data in respect of each electronic online authorization and uploading request payment transaction in a local database for accounting purposes.

23. A method according to claim 1, further comprising creating one or more software session instances for the electronic online authorization and uploading request, the software session instances controlling the receiving, presenting, constructing, establishing, transmitting, and generating and providing steps for the request.

24. A method according to claim 23, wherein there are a plurality of electronic online authorization and uploading requests to be processed and software session instances are created for each request, the method further comprising implementing the receiving, presenting, constructing, establishing, transmitting, and generating and providing steps for the plurality of requests concurrently.

25. A method according to claim 1, wherein the constructing step further comprises encrypting the electronic online authorization and uploading request.

26. A method according to claim 25, wherein the encrypting step comprises including a message authentication block within the electronic online authorization and uploading request.

27. An electronic online request generation and handling apparatus for generating and handling an electronic online authorization and uploading request from a merchant relating to a payment transaction, the apparatus comprising:

input means for inputting data relating to a customer's transaction card, and data relating to an original amount of the payment transaction;

presenting means arranged to present the original amount data to the customer'such that a gratuity amount is determined and in response thereto data relating to the gratuity amount is inputted via the input means;

constructing means arranged to build the electronic online authorization and uploading request, the request providing all of the transaction data necessary for an acquirer to authorize the transaction and to completely upload the payment transaction for reconciliation to the merchant, and including identification of the merchant, the transaction card data and data relating to a value of the transaction, the transaction value comprising the gratuity amount and the original amount;

communication means arranged to establish a link with the acquirer via a telecommunications network and to seek online authorization for the payment transaction by transmitting the electronic online authorization request; and means for generating and providing receipt data to the customer, the receipt data confirming authorization of the payment transaction at the transaction value when an electronic signal has been received specifying that the electronic online authorization and uploading request has been authorized.

28. A system according to claim 27, the system comprising:

an acquirer apparatus arranged to receive the electronic online authorization and uploading request from the electronic online request generation and handling apparatus, to authorize the payment transaction at the transaction value and to transmit an electronic signal authorising the electronic online authorization and uploading request over the telecommunications network to the electronic online request generation and handling apparatus.

29. An electronic online request generation and handling apparatus for generating and handling an electronic online authorization and uploading request from a merchant relating to a payment transaction, the apparatus comprising:

a payment card reader for inputting data relating to a customer's transaction card and an operator input device for inputting data relating to an original amount of the payment transaction;

a display for presenting the original amount data to the customer'such that a gratuity amount is determined and, in response thereto, data relating to the gratuity amount is inputted via the operator input device;

a request constructor arranged to build the electronic online authorization and uploading request, the request providing all of the transaction data necessary for an acquirer to authorize the transaction and to completely upload the payment transaction for reconciliation to the merchant, and including identification of the merchant, the transaction card data and data relating to a value of the transaction, the transaction value comprising the gratuity amount and the original amount;

an electronic fund transaction processing engine arranged to establish a link with an acquirer via a telecommunications network and to seek online authorization for the payment transaction by transmitting the electronic online authorization request; and a printer for providing receipt data to the customer, the receipt data confirming authorization of the payment transaction at the transaction value when an electronic signal has been received specifying that the electronic online authorization and uploading request has been authorized.

30. A system according to claim 29, the system comprising:

an acquirer apparatus arranged to receive the electronic online authorization and uploading request from the electronic online request generation and handling apparatus, to authorize the payment transaction at the transaction value and to transmit an electronic signal authorising the electronic online authorization and uploading request over the telecommunications network to the electronic online request generation and handling apparatus.

* * * * *

UNITED STATES PATENT AND TRADEMARK OFFICE
CERTIFICATE OF CORRECTION

PATENT NO.  : 6,848,613 B2
DATED       : February 1, 2005
INVENTOR(S) : Bruce Jeremy Nielsen and Hugh Michael O'Donnell It is certified that error appears in the above-identified patent and that said Letters Patent is hereby corrected as shown below:

Column 23,
Line 21, delete """ after the word "customer."

Column 24,
Line 15, delete """ after the word "customer."

Signed and Sealed this

Seventeenth Day of May, 2005

JON W. DUDAS
*Director of the United States Patent and Trademark Office*